US012564876B2

(12) United States Patent
Boyle et al.

(10) Patent No.: US 12,564,876 B2
(45) Date of Patent: Mar. 3, 2026

(54) CO-REACTIVE ADDITIVE MANUFACTURING COMPOSITIONS AND ARTICLES FOR USE IN INVESTMENT CASTING

(71) Applicant: PPG Industries Ohio, Inc., Cleveland, OH (US)

(72) Inventors: Bret M. Boyle, Pittsburgh, PA (US); Cynthia Kutchko, Pittsburgh, PA (US); Bryan W. Wilkinson, Pittsburgh, PA (US); Jacob M. Kupas, Pittsburgh, PA (US); Kerianne M. Dobosz, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 11 days.

(21) Appl. No.: 18/556,905

(22) PCT Filed: Feb. 25, 2022

(86) PCT No.: PCT/US2022/017920
§ 371 (c)(1),
(2) Date: Oct. 24, 2023

(87) PCT Pub. No.: WO2022/231694
PCT Pub. Date: Nov. 3, 2022

(65) Prior Publication Data
US 2024/0207923 A1 Jun. 27, 2024

Related U.S. Application Data

(60) Provisional application No. 63/180,215, filed on Apr. 27, 2021.

(51) Int. Cl.
*B33Y 70/00* (2020.01)
*B22C 7/02* (2006.01)
*B22C 9/04* (2006.01)
*B29C 64/314* (2017.01)
*B33Y 80/00* (2015.01)
*B29K 1/00* (2006.01)
*B33Y 10/00* (2015.01)

(52) U.S. Cl.
CPC .................. *B22C 7/02* (2013.01); *B22C 9/04* (2013.01); *B29C 64/314* (2017.08); *B33Y 70/00* (2014.12); *B33Y 80/00* (2014.12); *B29K 2001/12* (2013.01); *B29K 2005/00* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 5,364,889 A | 11/1994 | Quinn et al. | |
| 5,391,460 A | 2/1995 | Dougherty et al. | |
| 5,762,125 A | 6/1998 | Mastrorio | |
| 5,897,592 A | 4/1999 | Caldarise et al. | |
| 5,909,765 A | 6/1999 | McDowell | |
| 6,048,954 A | 4/2000 | Barlow et al. | |
| 6,117,612 A | 9/2000 | Halloran et al. | |
| 6,409,902 B1 | 6/2002 | Yang et al. | |
| 7,049,363 B2 | 5/2006 | Shen | |
| 7,964,248 B2 | 6/2011 | Fong et al. | |
| 8,334,025 B2 | 12/2012 | Fong et al. | |
| 9,902,860 B1 | 2/2018 | Li et al. | |
| 10,253,195 B2 | 4/2019 | Fenn et al. | |
| 10,391,670 B2 | 8/2019 | Yang et al. | |
| 10,639,705 B2 | 5/2020 | Fuccio | |
| 10,934,379 B2 | 3/2021 | Bonderer | |
| 11,434,704 B2 | 9/2022 | Tuttle et al. | |
| 2007/0203261 A1* | 8/2007 | Narayan .................. | C08K 9/08 523/205 |
| 2009/0224438 A1* | 9/2009 | Stampfl .................. | B33Y 70/00 264/496 |
| 2014/0017460 A1* | 1/2014 | Xu .......................... | C08L 75/16 264/447 |
| 2017/0210888 A1* | 7/2017 | An .......................... | C08L 61/12 |
| 2017/0322487 A1 | 11/2017 | Baur et al. | |
| 2017/0333980 A1 | 11/2017 | Yang et al. | |
| 2018/0001561 A1 | 1/2018 | Hascher et al. | |
| 2018/0161855 A1 | 6/2018 | Deines et al. | |
| 2018/0320006 A1 | 11/2018 | Lee et al. | |
| 2018/0370861 A1 | 12/2018 | Gold | |
| 2018/0371924 A1 | 12/2018 | Allen et al. | |
| 2019/0054681 A1* | 2/2019 | Fenn .................. | C08G 18/325 |
| 2019/0084034 A1 | 3/2019 | Iorlano et al. | |
| 2019/0105821 A1 | 4/2019 | Troitino Lopez | |

(Continued)

FOREIGN PATENT DOCUMENTS

| | | |
|---|---|---|
| WO | 2016085976 A1 | 6/2016 |
| WO | 2019241731 A1 | 12/2019 |

(Continued)

OTHER PUBLICATIONS

Anonymus, "RADCURE—Energy Curable Resins Product Guide—Coating and Inks Americas", Jan. 1, 2006, p. 1-28, XP055438226.
International Search Report and Written Opinion received for PCT Application Serial No. PCT/US2022/017920 dated Oct. 21, 2022, 15 pages.

*Primary Examiner* — Mohammad M Ameen

(74) *Attorney, Agent, or Firm* — Catherine Callahan

(57) ABSTRACT

Reactive additive manufacturing compositions with low amounts of noncombustible materials are provided, as well as methods of making and using the compositions. The compositions comprise two or more reactive components and a filler.

14 Claims, 6 Drawing Sheets

(56) References Cited

U.S. PATENT DOCUMENTS

2019/0300697 A1* 10/2019 Gallegos ................. C09D 7/62
2020/0108563 A1    4/2020 Kuester et al.

FOREIGN PATENT DOCUMENTS

WO      2019241911 A1   12/2019
WO      2020156898 A1    8/2020

* cited by examiner

CO-REACTIVE ADDITIVE MANUFACTURING COMPOSITIONS AND ARTICLES FOR USE IN INVESTMENT CASTING

CROSS-REFERENCES TO RELATED APPLICATIONS

This application is a § 371 National Stage Application of PCT International Application No. PCT/US2022/017920 filed Feb. 25, 2022, which claims priority to Provisional Patent Application No. 63/180,215, filed Apr. 27, 2021, each of which are incorporated herein by reference in their entirety for all purposes.

GOVERNMENT LICENSE RIGHTS

This invention was made with government support under Government Contract No. W911NF-17-2-0227 Additive Manufacturing (U.S. Army Research Laboratory, ARL). The government may have certain rights in the invention.

FIELD

The present disclosure relates to co-reactive additive manufacturing compositions and articles for use in investment casting, and methods of making and using thereof.

BACKGROUND

Investment casting is a process that is used to form molds to make objects. During a typical investment casting process, a wax pattern (the "investment") is made which has the same structure as the desired object. The wax pattern may be made from a master die or a mold, or may be carved, sculpted, or machined. Once created, the wax pattern is then coated with a refractory or investment material, such as ceramic, to form a shell. The wax pattern is then melted, vaporized, and/or burned out of the shell, leaving behind a relatively empty shell. The shell is then filled with the desired material of the final product, typically molten metal. The metal is then allowed to cool, and the shell is broken away from the final cast object.

The process of making wax patterns or investment is often labor intensive and time consuming. When making wax patterns from a master die, the die is often made of a metal and must be machined, requiring expensive equipment and long production times. Wax patterns are also made by sculpting the design into the wax, which requires high levels of skill and long production times.

What is needed is an improvement over the foregoing.

SUMMARY

The present disclosure provides reactive additive manufacturing compositions with low amounts of noncombustible materials, as well as methods of making and using the compositions. The compositions may comprise two or more co-reactive components and a filler.

The present disclosure provides a reactive additive manufacturing composition, comprising a first reactive component; a second reactive component; and at least one filler that is nonreactive with at least one of the first reactive component and the second reactive component, the at least one filler present in a total amount from 1 wt. % to 20 wt. % based on a total weight of the composition; wherein the composition comprises, based on a total weight of the composition, a total amount of less than 2.5 wt. % of components that are noncombustible when subjected to a temperature of at least 450° C. for at least 12 hours.

The present disclosure also provides a method of forming an object with a reactive additive manufacturing composition comprising combining a first reactive component, a second reactive component, and at least one filler that is nonreactive with at least one of the first reactive component and the second reactive component; mixing the first component, the second component, and the filler to form a reactive additive manufacturing composition; and depositing the reactive additive manufacturing composition through a nozzle fluidly coupled to the mixer to form a three-dimensional object, wherein the three-dimensional object comprises, based on a total weight of the three-dimensional object, a total amount of less than 2.5 wt. % of components that are noncombustible when subjected to a temperature of at least 450° C. for at least 12 hours.

The present disclosure also provides a three-dimensional object formed by reactive additive manufacturing, comprising the reaction product of a first component and a second component; at least one filler present in an amount from 1 wt. % to 20 wt. % based on a total weight of the composition and the object, wherein the filler is nonreactive with at least one of the first and second components; and wherein the object comprises, based on a total weight of the object, a total amount of less than 2.5 wt. % of components that are noncombustible when subjected to a temperature of at least 450° C. for at least 12 hours.

The present disclosure also provides a method of investment casting to form a final molded object, comprising combining a first reactive component, a second reactive component, and at least one filler that is nonreactive with at least one of the first reactive component and the second reactive component; mixing the first component, the second component, and the filler to form a reactive additive manufacturing composition; depositing the reactive additive manufacturing composition through a nozzle fluidly coupled to the mixer to form a three-dimensional object; coating the three-dimensional object with a refractory mold material to form a mold around the three-dimensional object; removing the three-dimensional object from the mold by combusting the three-dimensional object, wherein combusting the three-dimensional object produces a total ash residue of less than 2.5 wt. % based on a total weight of the three-dimensional object; casting a final molded object within the mold; and divesting the mold from the final molded object.

DETAILED DESCRIPTION

Figure 1:
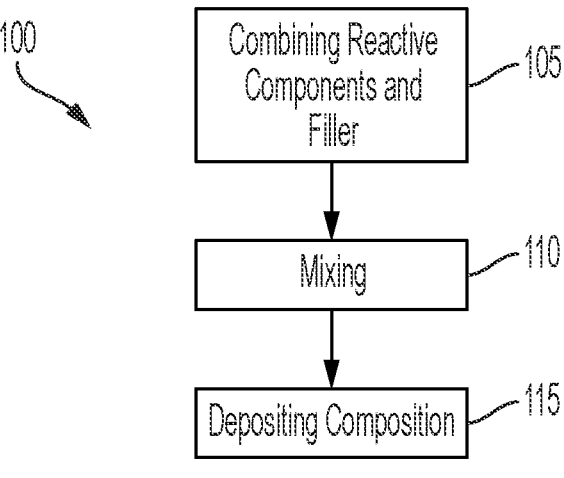
FIG. 1 is a simplified flowchart illustrating a method of making an article for use in investment casting according to certain embodiments.

The present disclosure provides reactive additive manufacturing compositions and articles for use in investment casting, as well as methods of making and using thereof.

The compositions may comprise two or more co-reactive components and a filler. The compositions may also comprise a low level of non-combustible materials.

In the process of investment casting, instead of forming wax patterns, additive manufacturing may be used to form the patterns or investments from polymeric materials. The co-reactive compositions as described herein may be used to form articles for use as investments. The articles may be combusted within the refractory coating to leave a mold for the final cast object. The co-reactive compositions and articles may comprise low levels of noncombustible materials, such as noncombustible fillers, and accordingly may reduce the amount of material left behind in the mold. Reducing residual material in the mold may reduce the cleaning needed within the mold and may reduce defects or imperfections in the mold or the final cast object.

I. Definitions

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." For example, numerical ranges provided for weight percentages of components or amounts of components added should be construed as being modified by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

"Polymer" and "Polymeric" refers to oligomers, homopolymers (e.g., prepared form a single monomer species), copolymers (e.g., prepared form at least two monomer species), terpolymers (e.g., prepared from at least three monomer species), and graft polymers.

"Printing" refers to any process in which a material is deposited onto and/or reacted with another material and/or itself, for example three-dimensional printing.

"Co-reactive composition" refers to a composition comprising at least two compounds capable of chemically reacting with each other to form covalent bonds.

"Reactive functional group" refers to a chemical group capable of chemically reacting with another reactive functional group to form a covalent bond.

"Reactive compound" refers to a compound comprising at least one reactive functional group.

"Extrusion" refers to a process used to create objects in which material is pushed through a die. An extrusion die has a shape and dimensions suitable to build an object. An extrusion die may have a fixed shape or a shape that can be changed during extrusion.

"Filler" refers to any compound added to a reactive compound or co-reactive composition that is nonreactive with at least a part of the compound and/or composition. Fillers as used herein encompasses particulates, fibers, slurries, mixtures, and any other compound and combinations thereof that may be added to a reactive compound and/or co-reactive composition.

II. Ambient Cured Co-Reactive Polymer Formulations.

The present disclosure provides co-reactive formulations. The system may comprise at least two co-reactive components, which may include polymers, prepolymers and/or oligomers. The co-reactive components are reactive with one another, such that the system may be cured at ambient temperature and pressure.

A variety of chemistries may be employed in additive manufacturing of co-reactive components. A co-reactive composition refers to a composition having at least one first component that is reactive with a least one second component. In addition to the first component and the second component, the composition may include other reactive and/or non-reactive components and additives such as fillers, rheology modifiers, adhesion promoters, pigments, and others. For example, the composition may include one or more solid state pigments. The at least one first component may comprise a first functional group and the at least one second component may comprise a second functional group, where the first functional group is reactive with the second functional group. The reaction may proceed without a catalyst.

The first component and the second component may have a single reactive functional group, but generally comprise two or more reactive functional groups such as from 2 to 20 functional groups, from 2 to 16, from 2 to 12, from 2 to 8, from 2 to 6, from 2 to 4, or from 2 to 3 reactive functional groups. The reactive functional groups may be terminal functional groups, pendant functional groups, or a combination of terminal and pendant functional groups.

The first co-reactive component may include compounds having more than one type of functional group A (see Table 1, below), and the second co-reactive component may include compounds having more than one type of functional group B (see Table I, below), such that an additive manufacturing material can comprise at least two sets of co-reactive A and B groups, wherein at least one co-reactive component has a functional group that is saturated. For example, a first co-reactive component may have compounds with hydroxyl groups and secondary amine groups (i.e., at least two different functional groups) and the second co-reactive component may have compounds with isocyanate groups. One or both of the co-reactive components may optionally comprise a catalyst for catalyzing the reaction between the A groups and the B groups.

TABLE 1

| Exemplary co-reactive chemistries | |
| --- | --- |
| Functional Group A | Functional Group B |
| Carboxylic Acid | Epoxide |
| Activated unsaturated groups such as acrylate, maleic, or fumaric | Primary or Secondary Amine |
| Isocyanate | Primary or Secondary Amine |
| Isocyanate | Hydroxyl |
| Cyclic Carbonate | Primary or Secondary Amine |
| Acetoacetate | Primary or Secondary Amine |
| Epoxide | Primary or Secondary Amine |
| Thiol | Alkenyl |
| Thiol | Vinyl Ether |
| Thiol | Methacrylate |
| Activated unsaturated groups such as acrylate or maleic | Malonate |

The first component and the second component can be combined in a suitable ratio to form a curable co-reactive composition. For example, the functional Group A to functional Group B equivalent ratio of a curable composition can be as about 1.0:1.0 or greater, about 1.0:1.2 or greater, about 1.0:1.4 or greater, about 1.0:1.6 or lower, about 1.0:1.8 or lower, about 1.0:2.0 or lower, or about 1.0:1.0 or greater, about 1.2:1.0 or greater, about 1.4:1.0 or greater, about 1.6:1.0 or lower, about 1.8:1.0 or lower, about 2.0:1.0 or lower, or within any range using these endpoints.

Examples of co-reactive compositions may include polyisocyanates and polyamines which react to form polyureas. The reaction of polyisocyanates and polyamines may proceed rapidly at room temperature thereby avoiding the need to control heat flow during deposition. The polyurea reaction may also proceed rapidly in the absence of a catalyst. Other examples of co-reactive compositions may include polyols which react with polyamines to form polyurethanes, polyamines which react with epoxies to form epoxy-amines, and polyamines which react with acrylates to form Michael addition formulations.

A. Polyurea Compositions.

The polyisocyanate component may comprise a polyisocyanate prepolymer and/or polyisocyanate monomer and the polyamine component may comprise a polyamine prepolymer and/or polyamine monomer. The polyisocyanate prepolymer and/or polyamine prepolymer can have a number average molecular weight as low as about 500 Daltons, about 1000 Daltons, about 2000 Daltons, about 5000 Daltons, about 7000 Daltons, about 10,000 Daltons, as high as about 11,000 Daltons, about 13,000 Daltons, about 15,000 Daltons, about 20,000 Daltons, or within any range including these endpoints.

The isocyanate functional component that may include polyisocyanate monomers and/or prepolymers, or a blend of polyisocyanates. For example, a polyisocyanate prepolymer can be prepared by reacting a polyol prepolymer and/or a polyamine prepolymer with a polyisocyanate such as a diisocyanate. Suitable polyisocyanate prepolymers are commercially available.

Suitable monomeric polyisocyanates may include isophorone diisocyanate (IPDI), which is 3,3,5-trimethyl-5-isocyanato-methyl-cyclohexyl isocyanate; hydrogenated diisocyanates such as cyclohexylene diisocyanate, 4,4'-methylenedicyclohexyl diisocyanate (H$_{12}$MDI); mixed aralkyl diisocyanates, such as tetramethylxylyl diisocyanates, OCN—C(—CH$_3$)$_2$-C$_6$H$_4$C(CH$_3$)$_2$—NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate, and 2-methyl-1,5-pentamethylene diisocyanate.

Suitable monomeric aromatic polyisocyanates may include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, toluidine diisocyanate and alkylated benzene diisocyanates generally; methylene-interrupted aromatic diisocyanates such as methylenediphenyl diisocyanate, especially the 4,4'-isomer (MDI), including alkylated analogs such as 3,3'-dimethyl-4,4'-diphenylmethane diisocyanate and polymeric methylenediphenyl diisocyanate.

Suitable polyisocyanates also include polyisocyanates prepared from dimers and trimers of diisocyanate monomers. Dimers and trimers of diisocyanate monomers can be prepared, for example, by methods described in U5. U.S. Pat. No. 5,777,061 at column 3, line 44 through column 4, line 40, which is incorporated by reference in its entirety. Dimers and trimers of diisocyanate monomers may contain linkages selected from isocyanurate, uretdione, biuret, allophanate and combinations thereof: such as Desmodur® N3600, Desmodur® CP2410, and Desmodur® N3400, available from Bayer Material Science.

A polyisocyanate may also comprise a polyisocyanate prepolymer. For example, a polyisocyanate may include an isocyanate-terminated polyether diol, an isocyanate-terminated extended polyether diol, or a combination thereof. An extended polyether diol refers to a polyether diol that has been reacted with an excess of a diisocyanate resulting in an isocyanate-terminated polyether prepolymer with increased molecular weight and urethane linkages in the backbone. Examples of polyether diols include Terathane® polyether diols such as Terathane® 200 and Terathane® 650 available from Invista, or the PolyTHF® polyether diols available from BASF. Isocyanate-terminated polyether prepolymers can be prepared by reacting a diisocyanate and a polyether diol as described in U.S. Application Publication No. 2013/0244340, which is incorporated by reference in its entirety.

A polyisocyanate prepolymer may include an isocyanate-terminated polytetramethylene ether glycol such as polytetramethylene ether glycols produced through the polymerization of tetrahydrofuran. Examples of suitable polytetramethylene ether glycols include Polymeg® polyols (LyondellBasell), PolyTHF® polyether diols (BASF), or Terathane® polyols (Invista).

Polyisocyanate prepolymers may also include isocyanate-terminated polyetheramines. Examples of polyether amines include polyetheramines, such as Jeffamine® (Huntsman Corp.), and polyetheramines available from BASF. Examples of suitable polyetheramines may include polyoxypropylenediamine.

The amine-functional co-reactive component may include primary, secondary, or tertiary amines, or combinations thereof. Examples of suitable aliphatic polyamines include ethylamine, the isomeric propylamines, butylamines, pentylamines, hexylamines, cyclohexylamine, ethylene diamine, 1,3-bis(aminomethyl)diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-dianiinododecane, 1,3-and/or 1,4-cyclohexane diamine, 1-amino-3,3,5-trimethyl-5-aminomethyl-cyclohexane, 2,4- and/or 2,6-hexahydro-toluylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

Example of suitable secondary amines may include aliphatic amines, such as a cycloaliphatic diamine. Such amines are available commercially from Huntsman Corporation (Houston, TX) under the designation of Jefflink® such as Jefflink® 754. Other examples include Clearlink@ 1000 (Dorf-Ketal Chemicals, LLC), and aspartic ester functional amines, such as those available under the name Desmophen® such as NH1220, Desmophen® NH 1420, and Desmophen® NH 1520 (Bayer Materials Science LLC). A secondary amine can be the reaction product of isophorone diamine and acrylonitrile, such as Polyclear® 136 (available from BASF/Hansen Group LLC). A polyamine can also be provided as an amine-functional resin. For example, an amine-functional resin may comprise an ester of an organic acid, such as an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. An example of such polyaspartic esters is the derivative of diethyl maleate and 1,5-diamino-2-methylpentane, available commercially from Bayer Corporation under the trade name Desmophen® NH1220. Other suitable compounds containing aspartate groups may be employed as well. Additionally, the secondary polyamines can include polyaspartic esters which can include derivatives of compounds such as maleic acid, fumaric acid esters, aliphatic polyamines and the like.

Suitable secondary amines may include acrylates and methacrylate-modified amines, including both mono- and poly-acrylate modified amines as well as acrylate or meth-acrylate modified mono- or polyamines. Acrylate or meth-acrylate modified amines may include aliphatic amines. Secondary amines may further aliphatic amines, such as a cycloaliphatic diamine. The amine may be provided as an amine-functional resin. Such amine-functional resins may be a relatively low viscosity, amine-functional resin suitable for use in the formulation of high solids polyurea three-dimensional objects. An amine-functional resin may comprise an ester of an organic acid, for example, an aspartic ester-based amine-functional reactive resin that is compatible with isocyanates; e.g., one that is solvent-free. An example of such polyaspartic esters is the derivative of diethyl maleate and 1,5-diamino-2-methylpentane, available commercially from Bayer Corporation, PA under the trade name Desmophen™ NH1220. Other suitable compounds containing aspartate groups may be employed as well.

The polyamine may include polyoxyalkyleneamines. Polyoxyalkyleneamines contain two or more primary amino groups attached to a backbone derived, for example, from propylene oxide, ethylene oxide, or a mixture thereof. Examples of such amines include polyoxypropylenediamine and glycerol tris[poly(propylene glycol), amine-terminated] ether such as those available under the designation Jeffam-ine™ from Huntsman Corporation.

The amine-functional co-reactive component may also include an aliphatic secondary amine such as Clearlink® 1000, available from Dor-Ketal Chemicals, LLC. The amine-functional co-reactive component may comprise an amine-functional aspartic acid ester, a polyoxyalkylene primary amine, an aliphatic secondary amine, or a combination of any of the foregoing.

In addition to the polyisocyanates and polyamines described above, polythiols may comprise at least one of the co-reactive components. The polythiol may comprise a monomeric polythiol, a polythiol prepolymer, or a combination thereof. A polythiol may comprise a dialkenyl having a thiol functionality, or a polyalkenyl having a thiol functionality.

A polythiol may comprise any suitable thiol-terminated prepolymers or combination of thiol-terminated prepolymers. Examples of suitable thiol-terminated sulfur-containing prepolymers include thiol-terminated polythioethers, thiol-terminated polysulfides, thiol-terminated sulfur-containing polyformals, and thiol-terminated monosulfides.

B. Polythiol Compositions.

A sulfur-containing prepolymer may comprise a thiol-terminated polythioether. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® P3.1E-2.8, Permapol® L56086, or a combination of any of the foregoing, each of which is available from PRC-DeSoto International Inc.

Examples of suitable dithiols may include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

Examples of suitable polythiols may include 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used. Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy) ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

C. Polyalkenyl Compositions.

Polyalkenyls may also comprise at least one of the co-reactive components. A polyalkenyl may comprise any suitable polyalkenyl prepolymer or combination of polyalkenyl prepolymers. A polyalkenyl prepolymer may comprise an alkenyl-terminated sulfur-containing prepolymer, which can be prepared, for example by reacting a dialkenyl compound with a thiol-terminated sulfur-containing prepolymer as described herein. A polyalkenyl may comprise a monomeric dialkenyl or combination of monomeric dialkenyls.

Examples of suitable polyalkenyls may include triallyl cyanurate (TAC), triallylisocyanurate (TAIC), 1,3,5-triallyl-1,3,5-triazinane-2,4,6-trione, 1,3-bis(2-methylallyl)-6- methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylal-lyl)-1,3,5-triazinane-2,4,6-trione, 1,2,4-trivinylcyclohexane, and combinations of any of the foregoing.

A polyalkenyl may comprise a polyalkenyl ether or a combination of polyalkenyl ethers. Examples of suitable bis(alkenyl)ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, and cyclohexanedimethanol divinyl ether.

D. Polyepoxide compositions.

A polyepoxide or combination of polyepoxides may comprise at least one of the co-reactive components. A polyepoxide can be monomeric, a prepolymer, or a combination thereof. A polyepoxide may comprise two or more reactive epoxy groups. Examples of suitable polyepoxides may include hydantoin diepoxide, a diglycidyl ether of bisphenol-A, a diglycidyl ether of bisphenol-F, a novolac-type polyepoxide, epoxidized unsaturated phenolic resins, dimer acid-based epoxy resins, urethane-modified diepoxides, epichlorohydrin derived polyepoxides, and combinations of any of the foregoing.

E. Polyol Compositions

A polyol or a combination of polyols may comprise at least one of the co-reactive components. A polyol can be monomeric, a prepolymer, or a combination thereof. Examples of suitable polyols may include diols, triols, carbonate diols, polyether polyols, polyester polyols, polyethylene oxide, polyethylene glycol, polypropylene glycol, polyvinyl alcohol, and combinations of any of the foregoing.

F. Sulfur-Containing Compositions

A sulfur-containing compound may comprise at least one of the co-reactive components. The sulfur-containing compound may be monomeric, a prepolymer, or a combination thereof. A polysulfide prepolymer refers to a prepolymer that contains one or more polysulfide linkages, i.e., $-S_x-$ linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of thiol-terminated polysulfide prepolymers include Thioplast® G polysulfides such as Thioplast® G1, Thioplast® G4, Thioplast® G10, Thioplast® G12, Thioplast® G21, Thioplast® G22, Thioplast® G44, Thioplast® G122, and Thioplast® G131, which are commercially available from AkzoNobel.

A sulfur-containing prepolymer may comprise a sulfur-containing polyformal prepolymer, a monosulfide prepolymer, combinations thereof.

G. Michael Addition Compositions.

Certain co-reactive compositions provided by the present disclosure may employ Michael addition reactive components. Co-reactive compositions employing a Michael addition curing chemistry may comprise a Michael donor compound and a Michael acceptor compound. In instances where Michael addition comprises 1,4 addition of nitrogen nucleophiles, the addition may be referred to as an Aza-Michael reaction or addition.

The Michael donor compound may comprise a Michael donor monomer, a Michael donor prepolymer, or a combination thereof. Michael donors may include amines, hydroxy group containing oligomers or polymers, acetoacetates, malonates, thiols, and combinations of any of the foregoing.

The Michael acceptor compound can comprise a Michael acceptor monomer, a Michael acceptor prepolymer, or a combination thereof. A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkyl-methacrylates, vinyl phosphonates, and vinyl pyridines.

A Michael acceptor may be a poly(meth)acrylate. Examples of difunctional methacrylates include 1,6-hexane-diol diacrylate, 1,6-hexanediol diacrylate, 6-hexanediol diacrylate, hydroxypivalic acid neopentyl glycol diacrylate, neopentyl glycol diacrylate, tripropylene glycol diacrylate, dipropylene diglycol diacrylate, tricyclodecane dimethanol diacrylate, tetrapentylene glycol diacrylate, polyethylene glycol diacrylate, polyethylene glycol diacrylate, polyethylene glycol 300 diacrylate, polyethylene glycol 600 diacrylate, and polyethylene glycol 400 diacrylate. Examples of trifunctional acrylates include trimethylolpropane triacrylate, trimethylol propane $(EO)_{15}$ triacrylate, glycerin triacrylate, pentaerythritol triacrylate, trimethylolpropane $(PO_3)$ triacrylate, tris(2-hydroxyethyl)isocyanurate triacrylate. Examples of multifunctional acrylates include pentaerythritol $(EO)_n$ tetraacrylate, trimethylolpropane tetraacrylate, pentaerythritol tetraacrylate, dipentaerythritol pentacrylate, and dipentaerythritol hexaacrylate.

Suitable examples of catalysts for Michael addition chemistries include tributylphosphine, triisobutylphosphine, tri-tertiary-butylphosphine, trioctyl phosphine, tris(2,4,4-trim-ethylpentyl)phosphine, tricyclopentylphosphine, tricyclohexalphosphine, tri-n-octylphosphine, tri-n-do-decylphosphine, triphenyl phosphine, and dimethyl phenyl phosphine.

Examples of suitable Michael donors, Michael acceptors, and catalysts are shown below in Table 2.

TABLE 2

| Examples of Michael donors, Michael acceptors, and catalysts | | |
|---|---|---|
| Michael donors | Michael acceptors | Catalysts |
| Acetylacetonates | Methacrylates | Strong bases such as DBU, DBN, TMG, TMP, TBD (MFC) |
| Malonates | Cyanoacrylates | Nucleophilic catalysts such as dimethylphenylphosphine |
| Nitroalkanes | Vinyl ethers | Tetrabutylammonium fluoride |
| Any other active methylene | Vinylpyridine | |
| | Any α,β-unsaturated carbonyl | |

The co-reactive components may react with one another at moderate temperatures, such as about 140° C. or less, about 100° C. or less, about 60° C. or less, about 50° C. or less, about 40° C. or less, about 30° C. or less, or about 25° C. or less. The co-reactive components may react with one another at ambient temperatures, such as 20° C. to 28°C.

H. Multi-Cure Chemistries

The co-reactive compositions as described herein may comprise multi-cure chemistries and may comprise two or more of the co-reactive components as disclosed herein. Co-reactive compositions may cure by at least two curing chemistries. A first curing chemistry may have a first reaction rate and a fast gel time at a temperature below 30° C. to provide a material that maintains its intended shape when deposited and can support overlying layers. A second curing chemistry may have a slower cure rate and slower gel time than the first curing chemistry at a temperature below 30° C. The first curing reaction may result in a polymeric network that provides structural integrity to a deposited layer and may facilitate the use of fast build rates. The first curing reaction may control the gel time of the co-reactive composition. The second curing reaction may take place over a longer period of time and may establish the bulk material properties of the object.

A co-reactive composition provided by the present disclosure may be characterized by at least two curing chemistries. For example, a co-reactive composition can be characterized by two, three, four or more curing chemistries. Each of the curing chemistries may independently have a reaction rate. At least one of the reaction rates may be faster than the other reaction rates. The reaction rate of reactive compounds may depend on a number of factors including, for example, the chemistry of the co-reactive compounds, the temperature of the co-reactive composition, the molecular weight of the co-reactive compounds, the catalyst (if used), and the viscosity of the co-reactive composition. The reaction rate of the co-reactive compounds may change during curing. The gel time of a co-reactive composition can be used as a practical measure of the reaction rate. The gel time refers to the duration between the time when co-reactive compounds are first combined and mixed to form a co-reactive composition to the time when the co-reactive composition can no longer be stirred by hand. In a co-reactive composition provided by the present disclosure the ratio of the first gel time to the second gel time may be, for example, greater than 1:2, greater than 1:4, greater than 1:6, greater than 1:8, greater than 1:10, greater than 1:15, greater than 1:20, greater than 1:40, or any range including any two of these ratios as endpoints.

Multi-cure co-reactive compositions may comprise any of the co-reactive compounds described herein, such as polythiols, polyamines, Michael acceptors, polyepoxides, polyisocyanates, sulfur-containing compounds, polythioethers, polysulfides, polyformals, and monomers, prepolymers, copolymers, and combinations thereof. Examples of suitable multi-cure chemistry components and the associated reactions are summarized in Table 3 below.

TABLE 3

| | Examples of Multi-Cure Chemistries | |
| Component 1 | Component 2 | Reactions |
| --- | --- | --- |
| Polythiol and Reactive Polyamine | Polyfunctional Michael acceptor | Thiol-Michael acceptor Amine-Michael acceptor |
| | Polyepoxide | Thiol-epoxy Amine-epoxy |
| | Polyfunctional Michael acceptor | Thiol-Michael acceptor Amine-Michael acceptor |
| | Polyepoxide | Thiol-epoxy Amine-epoxy |
| | Polyfunctional Michael acceptor | Thiol-Michael acceptor Amine-Michael acceptor |
| | Polyfunctional cyclic carbonate | Amine-cyclic carbonate |
| | Michael acceptor Polyanhydride | Thiol-Michael acceptor Amine-Michael acceptor Amine-anhydride |

TABLE 3-continued

| | Examples of Multi-Cure Chemistries | |
| Component 1 | Component 2 | Reactions |
| --- | --- | --- |
| | Polyepoxide | Thiol-epoxide |
| | Polyfunctional cyclic carbonate | Amine-epoxide Amine-cyclic carbonate |
| | Polyepoxide | Thiol-epoxy |
| | Polyacetoacetate | Amine-epoxy Amine-acetoacetate |
| | Polyepoxide | Thiol-epoxy |
| | Polyanhydride | Amine-epoxy Amine-anhydride |
| | Polyisocyanate | Thiol-isocyanate Amine-isocyanate |

Referring to Table 3 above, a first component of a co-reactive composition may comprise a polythiol and a co-reactive polyamine, and a second component may comprise a co-reactive compound such as a Michael acceptor and/or a polyepoxide, a polyisocyanate, a polyfunctional cyclic carbonate, a polyanhydride, and/or a polyacetoacetate. Examples of expected reactions between the reactants of the first and second components are also identified. In these reactions, the amine-catalyzed reaction between the polythiol and the Michael acceptor, polyepoxide and/or polyisocyanate may be expected to be faster than the reaction between the reactions of the amine-reactive compound with the polyamine.

Co-reactive compositions may have an equivalents ratio of thiol and amine groups to reactive groups of the reactive compound such as Michael acceptor groups, epoxy groups, and/or isocyanate groups from 1.0:1.5 to 1.5:1.0, such as from 1.0:1.4 to 1.4:1.0, from 1.0:1.3 to 1.3:1.0, from 1.0:1.2 to 1.2:1.0, or from 1.0:1.1 to 1.1:1.0, from 1.0:1.05 to 1.05:1.0, from 1.0:1.02 to 1.02:1.0, or any range including any two of these ratios as endpoints. Co-reactive compositions may have percent hydrogen equivalents derived from amine groups to the hydrogen equivalents derived from the polythiol of at least 10%, at least 15%, at least 20%, less than 95%, less than 90%, less than 85%, less than 80%, less than 75%, less than 70%, less than 65%, less than 60%, less than 55%, less than 50%, less than 45%, less than 40%, less than 35%, less than 30%, less than 25% or any range including any two of these values as endpoints.

Co-reactive compositions ay be characterized, for example, by a gel time at 25° C. of at least 10 seconds, at least 20 seconds, at least 30 seconds, at least 45 seconds, at least 1 minute, at least 2 minutes, at least 5 minutes, at least 10 minutes, least 15 minutes, less than 25 minutes, less than 20 minutes, less than 15 minutes, less than 10 minutes, less than 5 minutes, less than 150 seconds, less than 60 seconds, or any range including any two of these values as endpoints.

Further details regarding the present co-reactive compositions and their chemistries are disclosed in PCT/IB2018/056254 (published as WO 2019/035099), assigned to the assignee of the present disclosure, which is expressly incorporated by reference herein.

III. Fillers

The formulations of the present disclosure may further include various additives or fillers, such as rheology modifiers (e.g., silica), flow control agents, plasticizers, thermal stabilizers, UV stabilizers, wetting agents, dispersing auxiliaries, deformers, reactive diluents, flame retardants, catalysts, pigments, solvents, adhesion promoters, antioxidants, and combinations of any of the foregoing. The term "filler"

as used herein encompasses any of the aforementioned compounds and combinations thereof.

Any filler or combination of fillers can be used to control and/or facilitate a three-dimensional printing operation, including mixing and extrusion. For example, the filler(s) can control the viscosity, mixing, hydrophobicity, hydrophilicity, rheology, or a combination of any of the foregoing.

The fillers may also be used to control the amount of non-combustible material present in a co-reactive composition. A filler may be selected and present in an amount to reduce the overall amount of non-combustible material present in a composition. Stated differently, the filler may be selected to reduce a residual ash content within a composition after the composition is burned.

A filler may comprise, for example, an inorganic filler, an organic filler, a low-density filler, an electrically conductive filler, or a combination of any of the foregoing.

A. Noncombustible Fillers

Compositions of the present disclosure may comprise noncombustible fillers. Inorganic fillers, which may be non-combustible, that may be useful in compositions provided by the present disclosure may include carbon black, calcium carbonate, precipitated calcium carbonate, calcium hydroxide, hydrated alumina (aluminum hydroxide), fumed silica, silica, precipitated silica, silica gel, and combinations of any of the foregoing.

Noncombustible fillers may be present in the compositions in an amount to alter the properties of the compositions (e.g., viscosity, mixing, hydrophobicity, hydrophilicity, rheology, etc.), but below a threshold level to reduce the amount of noncombustible material present in the composition or articles thereof. For example, a noncombustible filler may be present in an amount less than 10 wt. %, less than 9 wt. %, less than 8 wt. %, less than 7 wt. %, less than 6 wt. %, less than 5 wt. %, less than 4 wt. %, less than 3.5 wt. %, less than 3 wt. %, less than 2.5 wt. %, less than 2 wt. %, less than 1.5 wt. %, less than 1 wt. %, less than 0.5 wt. %, less than 0.25 wt. %, or any range including any two of these values as endpoints, wherein the weight percent is based on the total weight of the co-reactive composition and/or articles or objects produced therefrom. Stated differently, a noncombustible filler may be present within one component of a co-reactive composition in an amount less than 10 wt. %, less than 9 wt. %, less than 8 wt. %, less than 7 wt. %, less than 6 wt. %, less than 5 wt. %, less than 4 wt. %, less than 3.5 wt. %, less than 3 wt. %, less than 2.5 wt. %, less than 2 wt. %, less than 1.5 wt. %, less than 1 wt. %, less than 0.5 wt. %, less than 0.25 wt. %, or any range including any two of these values as endpoints based on the weight of the one component of the composition. Additionally, the compositions and articles herein may be produced without any noncombustible fillers added.

B. Combustible Fillers

Compositions of the present disclosure may comprise combustible fillers. Combustible fillers may be entirely or mostly combustible and may be used to reduce the amount of noncombustible material within the co-reactive compositions or articles herein. Organic fillers, which may be combustible, that may be useful in compositions provided by the present disclosure may include thermoplastics, thermosets, or a combination thereof. Examples of suitable organic fillers include epoxies, epoxy-amides, ethylene tetrafluoroethylene copolymers, polyethylenes, polypropylenes, polyvinylidene chlorides, polyvinylfluorides, tetrafluoroethylene, polyamides, polyimides, ethylene propylenes, perfluorohydrocarbons, fluoroethylenes, polycarbonates, polyetheretherketones, polyetherketones, polyphenylene oxides, polyphenylene sulfides, polyether sulfones, thennoplastic copolyesters, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Further examples of suitable combustible fillers include polyamides, such as polyamide 6 and polyamide 12, polyimides, polyethylene, polyphenylene sulfides, polyether sulfones, polysulfones, polyethylimides, polyvinyl fluorides, thermoplastic copolyesters, and combinations of any of the foregoing.

Still further examples of suitable combustible fillers include lignocellulosic fillers (e.g., methylcellulose, carboxymethylcellulose, cellulose acetate butyrate, bamboo shoot extract, lignin), cellulosic polymers, cellulose derivatives, wax thixotropes, fibrous materials (e.g., wood pulp, polyester, thermoplastic fibers), organic extracts, nonionic synthetic associative thickeners (NSAT), urethane resins, hydrophobically modified ethoxylated urethane resins (HEUR), ground thermoplastics, ground thermosets, and combinations of any of the foregoing.

Another example of suitable combustible fillers includes polysaccharides, for example polysaccharides of the following formula (I):

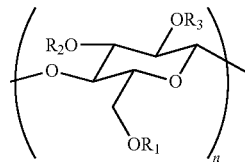

Wherein $R_1$, $R_2$, and $R_3$ are independently hydrogen, unsubstituted alkyl groups, or substituted alkyl groups, and n is at least 10.

Another example of a suitable combustible filler includes expandable microspheres. Expandable microspheres may comprise a thermoplastic shell encapsulating a gas or a liquid with a low boiling point. Upon heating to a temperature to soften the shell, the increasing pressure of the interior gas may cause the sphere to expand. An example of expandable microspheres is Expancel 461 commercially available through AkzoNobel.

The combustible fillers may be present in an overall co-reactive composition in an amount of at least 0.5 wt. %, at least 1 wt. %, at least 5 wt. %, at least 10 wt. %, at least 15 wt. %, at least 20 wt. %, at least 25 wt. %, at least 30 wt. %, or any range including any two of those values as endpoints. Stated differently, the combustible fillers may be present in one part of a co-reactive composition (e.g., with only a first reactive component or with only a second reactive component before mixing the reactive components), in an amount of at least 0.5 wt. %, 1 wt. %, at least 5 wt. %, at least 10 wt. %, at least 15 wt. %, at least 20 wt. %, at least 25 wt. %, at least 30 wt. %, or any range including any two of those values as endpoints.

IV. Printing and Investment Casting

The co-reactive compositions as disclosed herein may be used for additive manufacturing or 3D printing. For example, the co-reactive compositions may be used in ambient reaction extrusion (ARE) printing, in which reactive compounds are mixed to form a co-reactive composition, deposited onto a printing platform or onto a co-reactive composition, and cured at ambient conditions.

Referring to FIG. 1, a method 100 is shown for printing a 3D object. Method 100 comprises a combining step 105, a mixing step 110, and a depositing step 115. In combining step 105, a first reactive compound, a second reactive compound, and at least one filler are combined. The compounds and filler may be any of those described in the above sections. Prior to combination, the first reactive compound may be stored in a first reservoir, and the second reactive compound may be stored in a second reservoir. The filler may be stored with the first or second compounds in the first or second reservoirs respectively or may be stored in a third reservoir. Multiple fillers may be used, and either or both of the first and second compounds may be combined with a filler before combining step 105. Method 100 may comprise multiple combining steps, in which multiple components are combined, such as reactive components and fillers. The first reactive compound, second reactive compound, and at least one filler may all be combined in a fourth reservoir in combining step 105.

Mixing step 110 comprises mixing the first reactive compound, second reactive compound, and at least one filler to form a co-reactive composition. The mixing parameters such as time spent mixing, mixing speed, mixing device, temperature, and/or pressure may vary depending on operating parameters or desired product parameters such as the amount and type of compounds and fillers used, the volume of components in the mixture, desired properties of the co-reactive composition, desired properties of the printed object, and any combination of the foregoing. Mixing step 110 may be carried out in the same reservoir as the combining step 105. For example, the mixing step 110 may be carried out in a static mixer. Mixing step 110 may comprise mixing devices such as baffles, paddles, impellors, agitators, and any combination of the foregoing. The first reactive compound may begin to react with the second reactive compound at any point after the combining step 105, such as during and/or after mixing step 110.

Depositing step 115 comprises depositing the co-reactive composition formed from mixing step 110 onto a printing surface to form a printed object. The printing surface may be a printing bed or any other material. As the object is built up, the printing surface may be a surface of the co-reactive composition that has already been deposited. The co-reactive composition may be extruded through a die from the mixer or mixing reservoir onto the printing surface. As the co-reactive composition reacts and cures, the composition may begin to solidify into a solid, 3D object. The speed of the reaction/curing may be altered through selection of the reactive compounds and filler(s) used, as well as through the conditions at which mixing step 110 and/or depositing step 115 occur. For example, the mixing step 110 and depositing step 115 may occur at ambient conditions. As the co-reactive composition is deposited onto other layers or surfaces of already deposited co-reactive composition, the newly deposited composition may react/cure with the already deposited composition in order to form covalent bonds between the deposited layers. The newly deposited composition may also be deposited onto a composition that is entirely or mostly cured.

The depositing step 115 may be carried out through a 3D printing device. For example, the co-reactive composition may be extruded through a printing head coupled to a movable printing arm onto a printing bed. The printing bed itself may be movable relative to the printing head and/or arm. Movement of the printing head relative to the printing bed, either through movement of the head/arm, the bed, or combinations thereof, allows for the deposition of material into a three-dimensional shape.

Different co-reactive compositions, reactive compounds, and/or fillers may be added or combined with other co-reactive compositions, reactive compounds, and/or fillers at any point during method 100. For example, a first co-reactive composition may be deposited onto a printing bed, and a second co-reactive composition may be deposited onto the first co-reactive composition. Additionally, a first co-reactive composition may be made through a mixing step, and another filler may be added after the co-reactive composition was formed.

The amount of a co-reactive component may be dynamically changed during printing such that different parts can be fabricated using different print speeds. For example, certain portions of an object may have detail that is best fabricated using slower print speeds, while other portions of the object may be fabricated at higher print speeds. During the three-dimensional printing operation, the amount of a co-reactive component may be changed such that the gel time of the co-reactive composition is slower at slower print speeds, and faster at faster print speeds.

Figure 2:
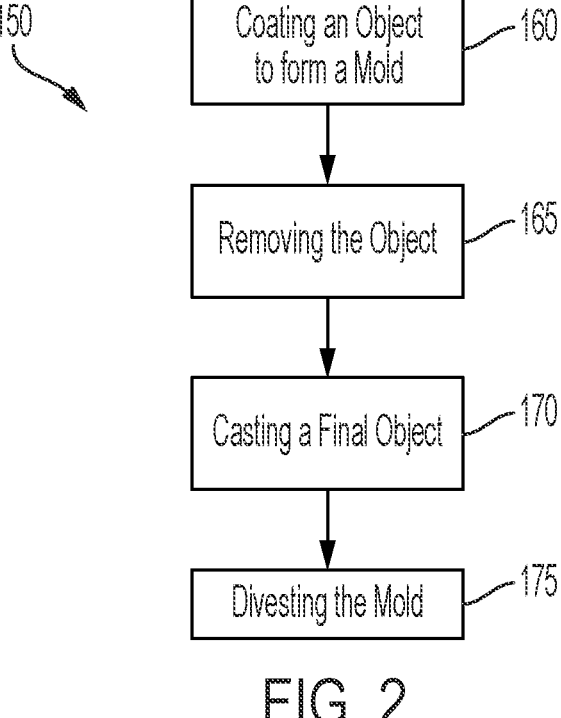
FIG. 2 is a simplified flowchart illustrating a method of investment casting using the article produced from the method of FIG. 1.

Referring now to FIG. 2, a method 150 is shown for investment casting using the printed object made from method 100. Method 150 comprises a coating step 160, a removing step 165, a casting step 170, and a divesting step 175. Coating step 160 comprises coating the printed object in a refractory mold material to form a mold around the object. The refractory mold material may be any material configured to coat and form a mold or a shell around the object, for example ceramic or polymer. Coating step 160 may be carried out in multiple steps, each time adding another layer of material onto the object. Coating step 160 may be carried out through any coating methods, such as spray coating, dip coating, brush coating, roll coating, kiss coating, spin coating, flow coating, and any combination of the foregoing. Coating step 160 may be used to create any thickness of coating around the printed object. After coating step 160, the coating is then cured or otherwise solidified to make the mold around the object.

Removing step 165 comprises removing the printed object from the mold. Removing step 165 may be carried out by melting or combusting the printed object within the mold. Removing step 165 may be carried out with a furnace, an oven, a fire, a kiln, a hot liquid bath, or combination of the foregoing. Any residual material within the mold may then be washed out. The co-reactive compositions as disclosed herein may comprise a low level of noncombustible materials, such as less than 2.5%, such that the printed object leaves behind a small amount or less of noncombustible material or ash within the mold after removing step 165. For example, the printed object may be combusted and leave behind an ash residue of less than 2.5% within the shell. Reducing the amount of noncombustible material left by the printed object may reduce the need for a washing or cleaning step after removing step 165.

Casting step 170 comprises casting a final object within the mold. The casting step may involve pouring a molten material, such as a metal, into the mold and allowing the molten material to cool. Divesting step 175 comprises divesting the mold from the final object. Divesting step 175 may involve breaking the mold to reveal the cast object within.

V. Properties of Co-Reactive Compositions and Printed Objects

The low-ash co-reactive compositions as disclosed herein generally exhibit superior rheological characteristics and/or buildability when compared to standard co-reactive compositions with inorganic fillers (e.g., fumed silica). As supported by at least rheology data shown in example 11, G', G" moduli of los-ash co-reactive compositions generally remain more elastic than viscous (i.e., G'>G") when switching from using an inorganic filler (e.g., fumed silica) to non-organic fillers (e.g., bamboo, methyl cellulose, or lignin). A storage modulus relates to the material's ability to store energy elastically. A loss modulus of a material relates to the material's ability to dissipate stress. When the storage modulus is higher than the loss modulus, the material is mainly elastic. In particularly, Aza-Michael compositions with organic (i.e., low-ash) fillers measured almost tripled moduli values than the Aza-Michael composition with inorganic filler, indicating an improved mechanical integrity. This improvement is further supported by the increase in yield stress, which generally indicates an increased capacity to withstand force before deforming plastically. This is particularly relevant in 3D printing in that, in order to build larger parts with multiple layers of materials stacked on top of each other, it is especially important that the material (e.g., at the lower layers) is able to withstand its own weight (e.g., from the upper layers). A high storage modulus and yield stress are good indicators of said ability, which is especially important for materials that cure slowly and/or for faster prints (i.e., shorter time per layer). While the rheology data of the polyurea compositions shown in Table 44 show that, when switching from using an inorganic filler (e.g., fumed silica) to non-organic fillers (e.g., bamboo, methyl cellulose, or lignin), the material became softer, the materials remain 3D printable with the help of fast (e.g., fivefold-to-tenfold increase in storage modulus in just the first few minutes into the chemical reaction) chemical reaction.

Buildability of a material, in particularly in the context of 3D printing, may be described in many ways. Generally, a material is more buildable when the deposited material has consistent shape and size (e.g., under the same printing conditions such as volumetric extrusion rate and relative movement speed of the extruder v. substrate) throughout a print to allow controlled printing. When the shape and/or size of the deposited material vary during a print, the print quality typically suffers at least for that the printed object often deviates from the intended shape and/or size, as defined by print parameters including print path, extrusion rate, movement speed. When the inconsistency is minor, surface roughness may increase, when the inconsistency is more severe, the object may collapse for lacking good support from lower layers. In addition to consistency, a material is considered more buildable when the deposited material deviates from the shape and size as intended by the print parameters as little as possible. For example, when the print path is designed for a 1 mm nozzle to be printed at a fly height (i.e., distance between the nozzle tip to the substrate or the previous layer, which may be referred to as the z-height) of 1 mm such that each filament has an expected height of 1 mm and an expected width of 1 mm, a material would be considered more buildable when the actual height is closer to 1 mm and the actual width is closer to 1 mm. This may relate to the accuracy of printing. A low accuracy of printing may be detrimental to the print quality of an object at least because the printed object would not be as intended. For applications such as investment casting, printing inaccuracies and inconsistencies shall be minimized to ensure high quality 3D printed molds, especially ones with intricate structures.

The present disclosure presents two buildability metrics relating to the abovementioned consistency and accuracy—vertical buildability and horizontal buildability. The vertical buildability relates to the height of a bead stack in relation to the number of layers of the stack. With a 1 mm fly height, an ideal vertical buildability would be a ratio of 1 mm/layer, with the height of the bead stack matching the number of layers of the stack. Excellent vertical buildability is defined as having ratios from 0.85 mm/layer to 1 mm/layer. Good vertical buildability is defined as having ratios from 0.60 mm/layer to 0.85 mm/layer. Poor vertical buildability is defined as having ratios below 0.60 mm/layer. The ratio mainly relates to accuracy, and a goodness-of-fit (e.g., R-squared) may be used to indicate consistency. It is to be appreciated that the abovementioned threshold ratios may be adjusted up or down for different applications, chemistries, or usage scenarios. The horizontal buildability relates to the width of a bead stack in relation to the expected width of a bead. Relating to accuracy, the more the width of the bead stack deviate from the expected width of a bead, the inferior the horizontal buildability. Relating to consistency, the more consistent the width of the bead (e.g., low standard of deviation) stack remains as the stack increases in height, the superior the horizontal buildability.

The low-ash co-reactive compositions of the present disclosure, when deposited to form a stack of beads having a single-bead-width using a 1 mm nozzle size and a 1 mm fly height, have a height per stack layer ratio of at least 0.3 mm/layer, 0.4 mm/layer, 0.5 mm/layer, 0.6 mm/layer, 0.7 mm/layer, 0.8 mm/layer, 0.9 mm/layer, 0.95 mm/layer, or within any range defined between any of the foregoing two values as endpoints. It is to be understood that the height per stack layer ratio for low-ash co-reactive compositions of the present disclosure may change, such as proportionally to the nozzle size and/or the fly height, when the nozzle size and/or fly height changes. As will be seen below in Example 11, the vertical buildability of various low-ash co-reactive compositions were compared using the same 1 mm nozzle size and the same 1 mm fly height for a meaningful comparison.

The low-ash co-reactive compositions of the present disclosure, when deposited to form a stack of beads having a single-bead-width using a 1 mm nozzle size and a 1 mm fly height, have a standard deviation in stack width below 0.5 mm, 0.4 mm, 0.3 mm, 0.3 mm, 0.25 mm, 0.2 mm, 0.125 mm, 0.1 mm, 0.075 mm, 0.05 mm, 0.025 mm, or within any range defined between any of the foregoing two values as endpoints. It is to be understood that the standard deviation for low-ash co-reactive compositions of the present disclosure may change, such as proportionally to the nozzle size and/or the fly height, when the nozzle size and/or fly height changes. As will be seen below in Example 12, the horizontal buildability of various low-ash co-reactive compositions were compared using the same 1 mm nozzle size and the same 1 mm fly height for a meaningful comparison.

The co-reactive compositions as disclosed herein and the printed objects formed from the co-reactive compositions may comprise a low level of non-combustible material. For example, a co-reactive composition and/or the printed object formed from the co-reactive composition may comprise non-combustible material in an amount less than 10 wt. %, less than 9 wt. %, less than 8 wt. %, less than 7 wt. %, less than 6 wt. %, less than 5 wt. %, less than 4 wt. %, less than 3.5 wt. %, less than 3 wt. %, less than 2.5 wt. %, less than 2 wt. %, less than 1.5 wt. %, less than 1 wt. %, less than 0.5 wt. %, or any range including any two of these values as endpoints, wherein the weight percent is based on the total weight of the co-reactive composition and/or the printed object.

Stated differently, a co-reactive composition and/or the printed object formed from the co-reactive composition may ash content/residue after combustion in an amount less than 10%, less than 9%, less than 8%, less than 7%, less than 6%, less than 5%, less than 4%, less than 3.5%, less than 3%, less than 2.5%, less than 2%, less than 1.5%, less than 1%, less than 0.5%, or any range including any two of these values as endpoints. The ash content may be measured after the co-reactive composition and/or printed object has been subject to a temperature of 450° C. for 12 hours.

The use of additive manufacturing in investment casting may remove the need for a master pattern to be made for casting wax patterns, which often involves machining. Additive manufacturing may allow for direct and precise printing of parts to be made through investment casting. The use of co-reactive compositions as described herein with a low amount of noncombustible material may reduce the cleaning or washing of the mold needed after removing the printed part from the mold and may also reduce imperfections in the mold or the final cast object.

EXAMPLES

Embodiments provided by the present disclosure are further illustrated by reference to the following examples. It will be apparent to those skilled in the art that many modifications, both to materials, and methods, may be practiced without departing from the scope of the disclosure.
Test Method—Ash Content In the following examples, the ash content of various 3D printed compositions was measured. The following procedure outlines the method by which ash content was measured.

Both, the ceramic crucible and sample to be tested, must be dried before analysis. This was be done by preconditioning in an oven at 110° C. for 1-2 hours. Once dry and cooled to room temperature in a desiccator, the dry, weighed sample was added to the pre-weighed and preconditioned crucible and placed over a flame to combust the sample until all flammable organic compounds were burned off. Then, the crucible was transferred to an oven set to 450° C. for 12 hours. Once the sample was completely ashed, the crucible was allowed to cool to ambient temperature in a desiccator, and then, weighed for ash content.

Example 1—Polyurea with Organic Filler

In this example, a 3D printable, 2K polyurea formulation utilizing organic fillers and rheology modifiers was printed and tested for ash content. The amine and the isocyanate components of the formulation were constructed using the compositions below. The amine-side composition was prepared from the components in Table 4.

TABLE 4

| Amine-side composition | |
| --- | --- |
| Component | Part by weight (g) |
| [1]Desmophen NH-1220 | 81.00 |
| [2]Disparlon 6500 | 9.00 |

TABLE 4-continued

| Amine-side composition | |
| --- | --- |
| Component | Part by weight (g) |
| [3]Methylcellulose | 8.90 |
| [4]Carboxymethylcellulose Sodium | 1.10 |

[1]Desmophen NH-1220, aspartic ester di-amine, CAS# 168253-59-6, commercially available from Covestro LLC
[2]Disparlon 6500, polyamide thixotrope, CAS# 25038-54-4, commercially available from King Industries, Inc.
[3]Methylcellulose, cellulosic thickener, CAS# 9004-67-5, commercially available from Sigma-Aldrich
[4]Carboxymethyl Cellulose Sodium, cellulosic thickener salt, CAS# 9004-32-4, commercially available from Fisher Scientific From Table 4, Desmophen NH-1220 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek. The specified amounts of methylcellulose and carboxymethylcellulose sodium were then dispersed into the mixture via typical Speedmixer procedure.

The isocyanate-side composition was prepared from the components in Table 5.

TABLE 5

| Isocyanate-side composition | |
| --- | --- |
| Component | Part by weight (g) |
| [5]Desmodur N3900 | 87.00 |
| [2]Disparlon 6500 | 13.00 |

[5]Desmodur N 3900, aliphatic polyisocynate, CAS# 28182-81-2, commercially available through Covestro LLC From Table 5, the Desmodur N3900 was weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and isocyanate composition were printed at a volume mix ratio of 1.3:1.

Thin samples were printed from the formulation and cut into smaller pieces for ash content analysis. Procedures for testing are documented in the test method section. A summary of relevant data is listed in Table 6.

TABLE 6

| Ash Content Analysis of 3D printed samples containing the composition described above: | |
| --- | --- |
| Sample | Ash Content (%) |
| 2K 3D printable polyurea formulation with only organic rheology modifiers | 0.1 |

Example 2—Polyurea with Inorganic and Organic Fillers

This example utilizes mostly organic fillers, and some inorganic fillers. A 3D printable, 2K polyurea formulation utilizing organic fillers and rheology modifiers in combination with small levels of inorganic fillers was printed and tested for ash content. The amine and the isocyanate components of the formulation were constructed using the compositions below. The amine-side composition was prepared from the components in Table 7.

TABLE 7

| Amine-side composition | |
| --- | --- |
| Component | Part by weight (g) |
| [1]Desmophen NH-1220 | 90 |
| [2]Disparlon 6500 | 10 |

From Table 7, Desmophen NH-1220 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek.

The isocyanate-side composition was prepared from the components in Table 8.

TABLE 8

| Isocyanate-side composition | |
| --- | --- |
| Component | Part by weight (g) |
| [5]Desmodur N3900 | 94.00 |
| [6]Expancel 461 | 4.00 |
| [7]Cabosil TS-720 | 2.00 |

[6]Expancel 461, expandable polymeric microspheres, commercially available through AkzoNobel
[7]Cabosil TS-720, fumed silica, commercially available through Cabot Corporation From Table 8, the Desmodur N3900, Expancel 461, and Cabosil TS-720 were weighed into a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and isocyanate composition were printed at a volume mix ratio of 1.2:1.

Thin samples were printed from the formulation and cut into smaller pieces for ash content analysis. Procedures for testing are documented in the Test Methods section. A summary of relevant data is listed in Table 9.

TABLE 9

| Ash Content Analysis of 3D printed samples containing the composition described above: | |
| --- | --- |
| Sample | Ash Content (%) |
| 2K 3D printable polyurea formulation with organic and inorganic rheology modifiers | 1.09 |

Example 3—Polyurea with Inorganic and Organic Fillers

This example utilizes mostly inorganic fillers and some organic fillers. A 3D printable, 2K polyurea formulation utilizing inorganic fillers, organic fillers and rheology modifiers was printed and tested for ash content. The amine and the isocyanate components of the formulation were constructed using the compositions below. The amine-side composition was prepared from the components in Table 10.

TABLE 10

| Amine-side composition | |
| --- | --- |
| Component | Part by weight (g) |
| [1]Desmophen NH-1220 | 90.00 |
| [2]Disparlon 6500 | 10.00 |

From Table 10, Desmophen NH-1220 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek.

The isocyanate-side composition was prepared from the components in Table 11.

TABLE 11

| Isocyanate-side composition | |
| --- | --- |
| Component | Part by weight (g) |
| [5]Desmodur N3900 | 95.00 |
| [7]Cabosil TS-720 | 5.00 |

From Table 11, the Desmodur N3900 and the Cabosil TS-720 were weighed into a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and isocyanate composition were printed at a volume mix ratio of 1.1:1.

Thin samples were printed from the formulation and cut into smaller pieces for ash content analysis. Procedures for testing are documented in the Test Methods section. A summary of relevant data is listed in Table 12.

TABLE 12

| Ash Content Analysis of 3D printed samples containing the composition described above: | |
| --- | --- |
| Sample | Ash Content (%) |
| 2K 3D printable polyurea formulation with organic and inorganic rheology modifiers | 2.33 |

Example 4—Polyurea with Inorganic Fillers

In this example, a 3D printable, 2K polyurea formulation utilizing inorganic fillers, and rheology modifiers was printed and tested for ash content. The amine and the isocyanate components of the formulation were constructed using the compositions below. The amine-side composition was prepared from the components in Table 13.

TABLE 13

| Amine-side composition | |
| --- | --- |
| Component | Part by weight (g) |
| [1]Desmophen NH-1220 | 95.00 |
| [7]Cabosil TS-720 | 5.00 |

From Table 13, Desmophen NH-1220 and Cabosil TS-720 were weighed into a Max 300 L DAC cup from Flacktek and mixed via typical Speedmixer procedure.

The isocyanate-side composition was prepared from the components in Table 14.

TABLE 14

| Isocyanate-side composition | |
| --- | --- |
| Component | Part by weight (g) |
| [5]Desmodur N3900 | 95.00 |
| [7]Cabosil TS-720 | 5.00 |

From Table 14, the Desmodur N3900 and the Cabosil TS-720 were weighed into a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and isocyanate composition were printed at a volume mix ratio of 1:1.

Thin samples were printed from the formulation and cut into smaller pieces for ash content analysis. Procedures for testing are documented in the Test Methods section. A summary of relevant data is listed in Table 15.

TABLE 15

| Ash Content Analysis of 3D printed samples containing the composition described above: | |
| --- | --- |
| Sample | Ash Content (%) |
| 2K 3D printable polyurea formulation with only inorganic rheology modifiers | 4.6 |

Example 5—Slow-Curing Polyurea with Organic Fillers

In this example, a slow-curing, 3D printable, 2K polyurea formulation utilizing organic fillers and rheology modifiers was printed and tested for ash content. The amine and the isocyanate components of the formulation were constructed using the compositions below. The amine-side composition was prepared from the components in Table 16.

TABLE 16

| Amine-side composition | |
| --- | --- |
| Component | Part by weight (g) |
| [8]Desmophen NH-1420 | 84.6 |
| [2]Disparlon 6500 | 9.40 |
| [3]Methylcellulose | 5.34 |
| [4]Carboxymethylcellulose Sodium | 0.66 |

[8]Desmophen NH-1420, aspartic ester di-amine, CAS# 136210-30-5, commercially available from Covestro LLC From Table 16, Desmophen NH-1420 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek. The specified amounts of methylcellulose and carboxymethylcellulose sodium were then dispersed into the mixture via typical Speedmixer procedure.

The isocyanate-side composition was prepared from the components in Table 17.

TABLE 17

| Isocyanate-side composition | |
| --- | --- |
| Component | Part by weight (g) |
| [5]Desmodur N 3900 | 87.00 |
| [2]Disparlon 6500 | 13.00 |

From Table 17, the Desmodur N3900 and the Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and isocyanate composition were printed at a volume mix ratio of 1.5:1.

Thin samples were printed from the formulation and cut into smaller pieces for ash content analysis. Procedures for testing are documented in the Test Methods section. A summary of relevant data is listed in Table 18.

TABLE 18

| Ash Content Analysis of 3D printed samples containing the composition described above: | |
| --- | --- |
| Sample | Ash Content (%) |
| 2K 3D printable slow-curing polyurea formulation with only organic rheology modifiers | 0.59 |

Example 6—Aza-Michael Addition Formulation with Organic Fillers

In this example, a 3D printable, 2K Aza-Michael Addition formulation utilizing organic fillers, and rheology modifiers was printed and tested for ash content. The amine and the acrylate components of the formulation were constructed using the compositions below. The amine-side composition was prepared from the components in Table 19.

TABLE 19

| Amine-side composition | |
| --- | --- |
| Component | Part by weight (g) |
| [9]Jeffamine T403 | 80.00 |
| [2]Disparlon 6500 | 10.00 |
| [3]Methylcellulose | 8.90 |
| [4]Carboxymethylcellulose Sodium | 1.10 |

[9]Jeffamine T403, polyetheramine, CAS # 39423-51-3, commercially available from Huntsman Corporation.

From Table 19, Jeffamine T403 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek. The specified amounts of methylcellulose and carboxymethylcellulose sodium were then dispersed into the mixture via typical Speedmixer procedure.

The acrylate-side composition was prepared from the components in Table 20.

TABLE 20

| Acrylate-side composition | |
| --- | --- |
| Component | Part by weight (g) |
| [10]Miramer M600 | 87.00 |
| [2]Disparlon 6500 | 13.00 |

[10]Miramer M600, Dipentaerythritol Hexaacrylate, CAS # 29570-58-9, commercially available from Miwon Specialty Chemical Co., Ltd.

From Table 20, the Miramer M600 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and acrylate composition were printed at a volume mix ratio of 1.7:1.

Thin samples were printed from the formulation and cut into smaller pieces for ash content analysis. Procedures for testing are documented in the Test Methods section. A summary of relevant data is listed in Table 21.

TABLE 21

| Ash Content Analysis of 3D printed samples containing the composition described above: | |
| --- | --- |
| Sample | Ash Content (%) |
| 2K 3D printable Aza-Michael Addition formulation with only organic rheology modifiers | 0.05 |

Example 7—Epoxy-Amine Formulation with Organic Fillers

In this example, a 3D printable, 2K Epoxy-Amine formulation utilizing organic fillers, and rheology modifiers was printed and tested for ash content. The amine and the epoxy components of the formulation were constructed using the compositions below.

The amine-side composition was prepared using the components in Table 22.

TABLE 22

| Amine-side composition | |
| --- | --- |
| Component | Part by weight (g) |
| [9]Jeffamine T403 | 78.74 |
| [11]Ancamine K54 | 5.25 |
| [2]Disparlon 6500 | 10.50 |
| [3]Methylcellulose | 4.93 |
| [4]Carboxymethylcellulose Sodium | 0.58 |

[11]Ancamine K54, 2,4,6-tris(dimethylaminomethyl)phenol, CAS # 90-72-2, commercially available from Evonik Industries.

From Table 22, Jeffamine T403 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek. The specified amounts of ancamine k54, methylcellulose and carboxymethylcellulose sodium were then dispersed into the mixture via typical Speedmixer procedure.

The epoxy-side composition was prepared from the components in Table 23.

TABLE 23

| Epoxy-side composition | |
| --- | --- |
| Component | Part by weight (g) |
| [12]Epon 828 Resin | 90.00 |
| [2]Disparlon 6500 | 10.00 |

[12]Epon 828 Resin, bisphenol A diglycidyl ether epoxy resin, CAS # 25068-38-6, commercially available Hexion Specialty Chemicals.

From Table 23, the Epon 828 Resin and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and epoxy composition were printed at a volume mix ratio of 2.4:1.

Thin samples were printed from the formulation and cut into smaller pieces for ash content analysis. Procedures for testing are documented in the Test Methods section. A summary of relevant data is listed in Table 24.

TABLE 24

| Ash Content Analysis of 3D printed samples containing the composition described above: | |
| --- | --- |
| Sample | Ash Content (%) |
| 2K 3D printable Epoxy-Amine formulation with only organic rheology modifiers | 0.02 |

Example 8—Polyurea with Bamboo Fillers

In this example, a 3D printable, 2K polyurea formulation utilizing bamboo extract fillers and rheology modifiers was printed and tested for ash content. The amine and the isocyanate components of the formulation were constructed using the compositions below. The amine-side composition was prepared from the components in Table 25.

TABLE 25

| Amine-side composition | |
| --- | --- |
| Component | Part by weight (g) |
| [8]Desmophen NH 1420 | 81.82 |
| [2]Disparlon 6500 | 9.09 |
| [13]Bamboo extract | 9.09 |

[13]Bamboo extract, 100% pure bamboo shoot extract, commercially available from Pure Organic Ingredients.

From Table 25, Desmophen NH 1420 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek. The specified amount of bamboo extract was then dispersed into the mixture via typical Speedmixer procedure.

The isocyanate-side composition was prepared from the components in Table 26.

TABLE 26

| Isocyanate-side composition | |
| --- | --- |
| Component | Part by weight (g) |
| [5]Desmodur N 3900 | 87.00 |
| [2]Disparlon 6500 | 13.00 |

From Table 26, the Desmodur N 3900 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The amine composition and isocyanate composition were printed at a volume mix ratio of 1.5:1.

Thin samples were printed from the formulation and cut into smaller pieces for ash content analysis. Procedures for testing are documented I the Test Methods section. A summary of relevant data is listed in Table 27.

TABLE 27

| Ash Content Analysis of 3D printed samples containing the composition described above: | |
| --- | --- |
| Sample | Ash Content (%) |
| 2K 3D printable polyurea formulation with bamboo extract rheology modifiers | 0.15 |

Example 9—Polyurethane with Organic Fillers

In this example, a 3D printable, 2K polyurethane formulation utilizing organic fillers and rheology modifiers was printed and tested for ash content. The polyol and the isocyanate components of the formulation were constructed using the compositions below. The polyol-side composition was prepared from the components in Table 28.

TABLE 28

| Polyol-side composition | |
| --- | --- |
| Component | Part by weight (g) |
| [14]Eternacoll PH-100 | 81.00 |
| [2]Disparlon 6500 | 9.00 |
| [15]Dibutyltin Dilaurate | 0.70 |
| [16]Lignin | 9.30 |

[14]Eternacoll PH-100, poly(hexamethylene-pentamethylene) carbonate diol, CAS # 126773-01-1, commercially available from UBE Industries, LTD.
[15]Dibutyltin Dilaurate, CAS # 77-58-7, commercially available from Sigma Aldrich.
[16]Lignin, CAS # 8068-05-1, commercially available from Sigma Aldrich.

From Table 28, Eternacoll PH-100 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek. The specified amounts of dibutyltin dilaurate and lignin were then dispersed into the mixture via typical Speedmixer procedure.

The isocyanate-side composition was prepared from the components in Table 29.

TABLE 29

| Isocyanate-side composition | |
| --- | --- |
| Component | Part by weight (g) |
| [5]Desmodur N 3900 | 87.00 |
| [2]Disparlon 6500 | 13.00 |

From Table 29, the Desmodur N 3900 and Disparlon 6500 were weighed into a metal beaker and dispersed via typical Cowles grind procedure under a nitrogen blanket for thirty minutes at 165° F. to activate the Disparlon 6500. This dispersion was then transferred to a Max 300 L DAC cup from Flacktek and mixed via typical Speedmixer procedure.

Formulations were transferred from the DAC cup to an Optimum cartridge via Flacktek SpeedDisc to be suitable for 3D printing by reactive extrusion via Viscotec 2k extruders mounted to a gantry such as the Lulzbot Taz 6. The polyol composition and isocyanate composition were printed at a volume mix ratio of 2.8:1.

Thin samples were printed from the formulation and cut into smaller pieces for ash content analysis. Procedures for testing are documented in the Test Methods section. A summary of relevant data is listed in Table 30.

TABLE 30

| Ash Content Analysis of 3D printed samples containing the composition described above: | |
| --- | --- |
| Sample | Ash Content (%) |
| 2K 3D printable polyurethane formulation with lignin rheology modifiers | 0.23 |

Example 10—Multi-Cure Chemistry

In this example, multi-cure chemistries may be used in a co-reactive composition and tested for ash content. A 3D printable, multicure formulation utilizing organic fillers and rheology modifiers may be used for low ash content. The multicure formulation could include at least 2 amine-reactive components such as an epoxy and an acrylate. The amine component could include amine-functional materials with a functionality of 2 or more. During cure, the reactions proceeding may consist of an Aza-Michael addition cure chemistry and epoxy-amine chemistry. Some potential formulation components are shown below in Table 31 and 32. The amine-side composition is prepared from the components in Table 31.

TABLE 31

| Amine-side composition | |
| --- | --- |
| Component | Part by weight (g) |
| [9]Jeffamine T403 | 78.74 |
| [11]Ancamine K54 | 5.25 |

TABLE 31-continued

| Amine-side composition | |
| --- | --- |
| Component | Part by weight (g) |
| [2]Disparlon 6500 | 10.50 |
| [3]Methylcellulose | 4.93 |
| [4]Carboxymethylcellulose Sodium | 0.58 |

From Table 31, Jeffamine T403 and Disparlon 6500 would be weighed into a metal beaker and dispersed via typical Cowles grind procedure under a nitrogen blanket for thirty minutes at 165° F. to activate the Disparlon 6500. This dispersion could then be transferred to a Max 300 L DAC cup from Flacktek. The specified amounts of Ancamine K54, Methylcellulose, and Carboxymethylcellulose could then dispersed into the mixture via typical Speedmixer procedure. The amine-reactive side composition is prepared from the components in Table 32.

TABLE 32

| Amine-reactive side composition | |
| --- | --- |
| Component | Part by weight (g) |
| [10]Miramer M600 | 80.00* |
| [12]Epon 828 Resin | 10.00* |
| [2]Disparlon 6500 | 10.00 |

From Table 32, the Miramer M600, Epon 828 Resin, and Disparlon 6500 could be weighed into a metal beaker and dispersed via typical Cowles grind procedure under a nitrogen blanket for thirty minutes at 165° F. to activate the Disparlon 6500. This dispersion could then be transferred to a Max 300 L DAC cup from Flacktek and mixed via typical Speedmixer procedure.

Formulations would then be transferred from the DAC cup to an Optimum cartridge via Flacktek SpeedDisc to be suitable for 3D printing by reactive extrusion via Viscotec 2k extruders mounted to a gantry such as the Lulzbot Taz 6. The multicure composition could be printed at a volume mix ratio of 1.5:1*.

Thin samples can then be printed from the formulation and cut into smaller pieces for ash content analysis. Procedures for testing are documented in the Test Methods section. An example of the expected, relevant data is listed in Table 33.

TABLE 33

| Potential Ash Content Analysis of 3D printed samples containing the composition described above | |
| --- | --- |
| Sample | Ash Content ( %) |
| 3D printable multicure formulation with organic rheology modifiers | <2 |

*These values may range from 10-80% and the volume mix ratio will adjust accordingly.

As shown in the above examples, the use of organic fillers with a number of different co-reactive components produced compositions that produced an ash content less than that of compositions comprising only inorganic fillers. Stated differently, co-reactive compositions with organic fillers, and optionally some amounts of inorganic fillers, may comprise a low level of noncombustible material. This may be true for a number of different co-reactive chemistries and different fillers.

Example 11—Rheological Characterization

The yield stress, storage modulus, and loss modulus of various compositions were measured. The following outlines the method by which said rheology data were measured.

For rheological characterization, each composition of Examples 11a-11h was prepared by mixing a component A and a component B to create a two-part mixture. The mixture preparation process involved grinding and/or speedmixing, similar to the process used to prepare compositions of Examples 1-10. Once mixing was complete, a stopwatch was used to track how long into the chemical reaction each mixture was while rheological measurements were recorded. Each mixture was characterized using an Anton Paar MCR 302 rheometer. Specifically, to measure storage modulus and loss modulus, collection of moduli measurements began immediately after each sample was mixed and a shear strain of 0.3% was applied to the sample at 1 Hz and a data sampling rate of every six seconds. To measure yield stress, collection of storage modulus measurements began 3 minutes after each sample was mixed and a logarithmic ramp of shear strain was applied starting at 0.01% and ending at 10% over a time period of 62 seconds. Yield stress for each composition was next determined as the shear stress value corresponding to where the storage modulus dropped below 95% of its maximum value. Another set of theology data was collected at 6 minutes into the reaction rather than 3 minutes.

Example 11a—Aza Michael with Inorganic Filler

TABLE 34

| | Part by weight (g) |
| --- | --- |
| Component A | |
| [10]Miramer M600 | 95.00 |
| [7]Cabosil TS-720 | 5.00 |
| Component B | |
| [9]Jeffamine T403 | 90.00 |
| [7]Cabosil TS-720 | 10.00 |

Example 11b—Aza Michael with Bamboo Filler

TABLE 35

| | Part by weight (g) |
| --- | --- |
| Component A | |
| [10]Miramer M600 | 91.00 |
| [2]Disparlon 6500 | 9.00 |
| Component B | |
| [9]Jeffamine T403 | 84.00 |
| [2]Disparlon 6500 | 8.00 |
| [13]Bamboo extract | 8.00 |

Example 11c—Aza Michael Methyl Cellulose Filler

TABLE 36

|  | Part by weight (g) |
|---|---|
| Component A | |
| [10]Miramer M600 | 91.00 |
| [2]Disparlon 6500 | 9.00 |
| Component B | |
| [9]Jeffamine T403 | 84.00 |
| [2]Disparlon 6500 | 8.00 |
| [3]Methylcellulose | 7.12 |
| [4]Carboxymethylcellulose Sodium | 0.88 |

Example 11d—Aza Michael with Lignin Filler

TABLE 37

|  | Part by weight (g) |
|---|---|
| Component A | |
| [10]Miramer M600 | 91.00 |
| [2]Disparlon 6500 | 9.00 |
| Component B | |
| [9]Jeffamine T403 | 84.00 |
| [2]Disparlon 6500 | 8.00 |
| [16]Lignin | 8.00 |

Example 11e—Polyurea with Inorganic Filler

TABLE 38

|  | Part by weight (g) |
|---|---|
| Component A | |
| [5]Desmodur N3900 | 95.00 |
| [7]Cabosil TS-720 | 5.00 |
| Component B | |
| [8]Desmophen NH-1420 | 95.00 |
| [7]Cabosil TS-720 | 5.00 |

Example 11f—Polyurea with Bamboo Filler

TABLE 39

|  | Part by weight (g) |
|---|---|
| Component A | |
| [5]Desmodur N3900 | 91.00 |
| [2]Disparlon 6500 | 9.00 |
| Component B | |
| [8]Desmophen NH-1420 | 84.00 |
| [2]Disparlon 6500 | 8.00 |
| [13]Bamboo extract | 8.00 |

Example 11g—Polyurea with Methyl Cellulose Filler

TABLE 40

|  | Part by weight (g) |
|---|---|
| Component A | |
| [5]Desmodur N3900 | 91.00 |
| [2]Disparlon 6500 | 9.00 |
| Component B | |
| [8]Desmophen NH-1420 | 84.00 |
| [2]Disparlon 6500 | 8.00 |
| [3]Methylcellulose | 7.12 |
| [4]Carboxymethylcellulose Sodium | 0.88 |

Example 11h—Polyurea with Lignin Filler

TABLE 41

|  | Part by weight (g) |
|---|---|
| Component A | |
| [5]Desmodur N3900 | 91.00 |
| [2]Disparlon 6500 | 9.00 |
| Component B | |
| [8]Desmophen NH-1420 | 84.00 |
| [2]Disparlon 6500 | 8.00 |
| [16]Lignin | 8.00 |

A summary of yield stress, G', and G" data at 3 minutes into the reaction is listed in Table 42.

TABLE 42

| Formulation | Yield Stress @ 3 minutes (Pa) | G' @ 3 minutes (Pa) | G" @ 3 minutes (Pa) |
|---|---|---|---|
| Aza-Michael w/Silica Filler (Example 11a) | 15.70 | 5398.8 | 1143.6 |
| Low-Ash Aza-Michael w/ Bamboo (Examples 11b) | 55.77 | 34863 | 7087.3 |
| Low-Ash Aza-Michael w/ Cellulose (Examples 11c) | 30.59 | 18563 | 3491.6 |
| Low-Ash Aza-Michael w/ Lignin (Examples 11d) | 28.87 | 15315 | 3324.6 |
| Polyurea w/Silica Filler (Example 11e) | 171.6 | 2169.1 | 568.67 |
| Low-Ash Polyurea w/ Bamboo (Examples 11f) | 38.88 | 1317.1 | 1316.4 |
| Low-Ash Polyurea w/ Cellulose (Examples 11g) | 24.11 | 1645.9 | 1410.3 |
| Low-Ash Polyurea w/ Lignin (Examples 11h) | 34.05 | 790.10 | 1325.9 |

A summary of yield stress, G', and G" data at 6 minutes into the reaction is listed in Table 43.

TABLE 43

| Formulation | Yield Stress @ 6 minutes (Pa) | G' @ 6 minutes (Pa) | G" @ 6 minutes (Pa) |
|---|---|---|---|
| Aza-Michael w/Silica Filler (Example 11a) | 18.03 | 5924.6 | 1226.1 |
| Low-Ash Aza-Michael w/ Bamboo (Examples 11b) | 56.75 | 38330 | 7757.5 |

TABLE 43-continued

| Formulation | Yield Stress @ 6 minutes (Pa) | G' @ 6 minutes (Pa) | G" @ 6 minutes (Pa) |
|---|---|---|---|
| Low-Ash Aza-Michael w/ Cellulose (Examples 11c) | 33.91 | 20369 | 3907.5 |
| Low-Ash Aza-Michael w/ Lignin (Examples 11d) | 29.48 | 17224 | 3957.1 |
| Polyurea w/Silica Filler (Example 11e) | 171.6 | 2377.5 | 761.83 |
| Low-Ash Polyurea w/ Bamboo (Examples 11f) | 39.27 | 1794.3 | 2082.2 |
| Low-Ash Polyurea w/ Cellulose (Examples 11g) | 28.68 | 2354.6 | 2310.7 |
| Low-Ash Polyurea w/ Lignin (Examples 11h) | 37.86 | 1232.7 | 2368.6 |

A summary of relevant rheology data is listed in ranges in Table 44 along with ash content.

TABLE 44

| Metric | Aza-Michael w/Inorganic Filler (Example 11a) | Low-Ash Aza-Michael (Examples 11b, 11c, 11d) | Polyurea w/ Inorganic Filler (Example 11e) | Low-Ash Polyurea (Examples 11f, 11g, 11h) |
|---|---|---|---|---|
| Yield Stress at 3 min (Pa) | 15.7 | 28.87-55.77 | 171.6 | 24.11-38.88 |
| G' at 3 min (Pa) | 5398.8 | 15817-34863 | 2169.1 | 790.1-1645.9 |
| G" at 3 min (Pa) | 1143.6 | 3469-7087 | 568.67 | 1316.4-1410.3 |
| Yield Stress at 6 min (Pa) | 18.03 | 29.48-56.75 | 171.6 | 28.68-39.27 |
| G' at 6 min (Pa) | 5924.6 | 17224-38330 | 2377.5 | 1232.7-2354.6 |
| G" at 6 min (Pa) | 1226.1 | 3907.5-7757.5 | 761.83 | 2082.2-2368.6 |
| Ash Content | 5% | <0.1% | 5% | <0.1% |

Example 12—Buildability Characterization

The vertical buildability and horizontal buildability of various compositions were measured. The following outlines the method by which said buildability data were measured.

Figure 3:
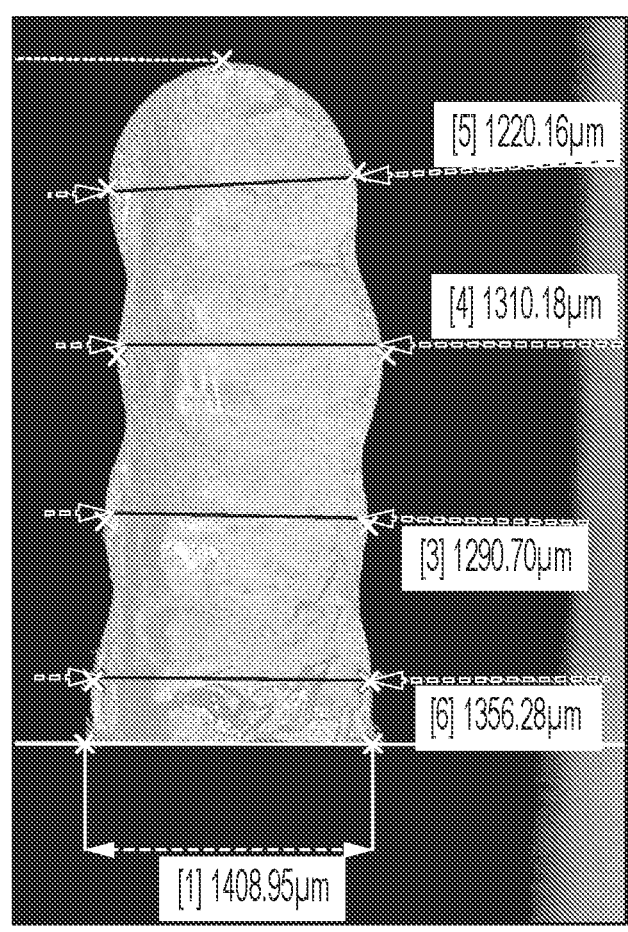
FIG. 3 shows a cross-sectional view of a stack of beads 3D-printed using a low-ash composition.

To assess the vertical buildability and horizontal buildability of the compositions, single width beads of each compositions of Examples 11a-11h were printed in stacks between 1 and 5 beads tall. The stacks of beads were cross sectioned and imaged on a Keyence VR-3000 series Macroscope. From those images (see FIG. 3 for an example), measurements of the bead stacks height from base to top as well as the widths of the bead stacks were taken at the center of each printed bead. To circumvent surface tension effects, the width of the bead stack is measured starting at second layer rather than the first.

A summary of buildability data is listed in Table 45 along with ash content.

TABLE 45

| Metric | Aza-Michael w/Inorganic Filler (Example 11a) | Low-Ash Aza-Michael (Examples 11b, 11c, 11d) | Polyurea w/ Inorganic Filler (Example 11e) | Low-Ash Polyurea (Examples 11f, 11g, 11h) |
|---|---|---|---|---|
| Vertical Buildability (mm/layer) | 0.625 | 0.9-0.945 | 0.77 | 0.56-0.72 |
| Horizontal Buildability (Std. in stack width) | 0.115 | 0.02-0.03 | 0.06 | 0.075-0.125 |
| Ash Content | 5% | <0.1% | 5% | <0.1% |

Figure 4:
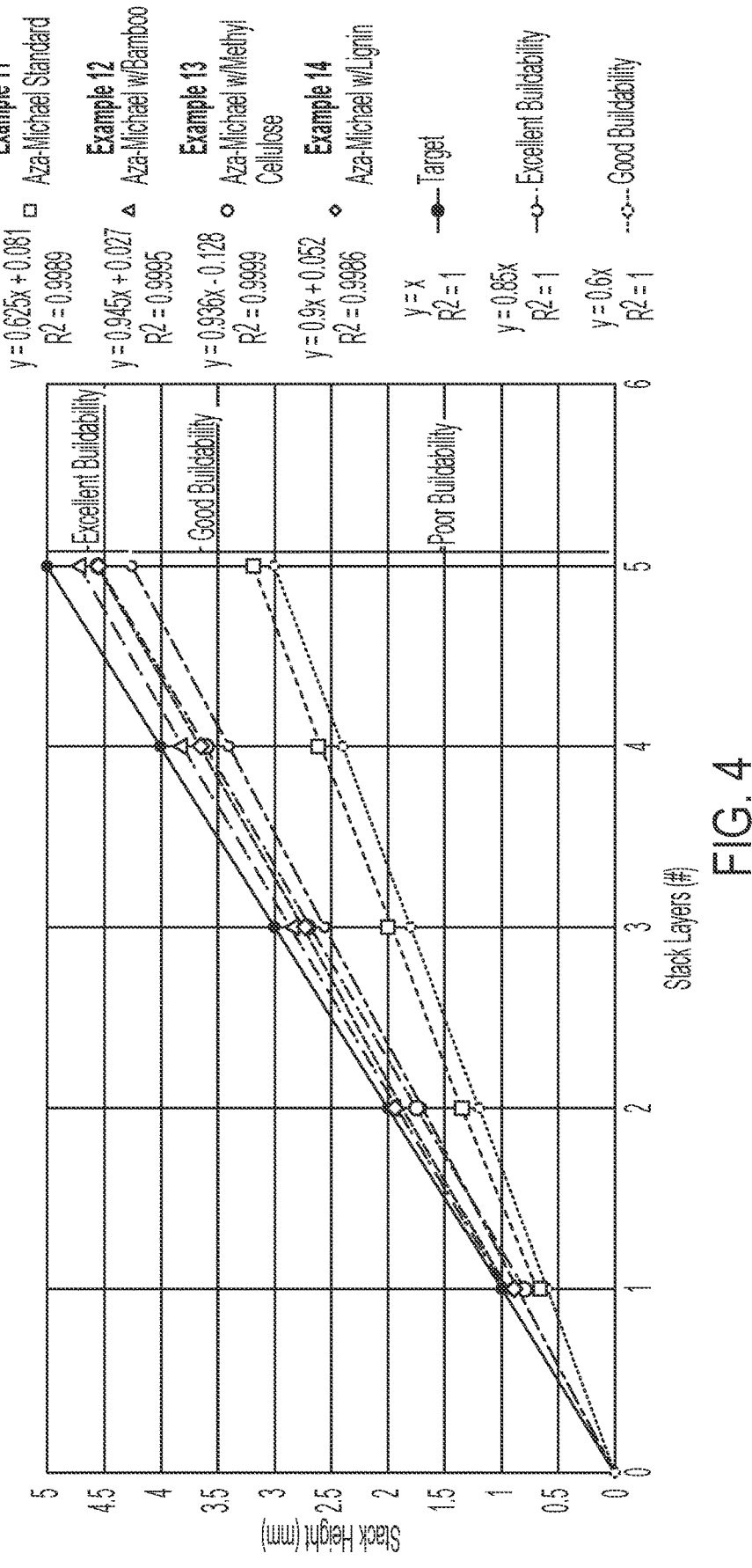
FIG. 4 shows vertical buildability data for various Aza-Michael compositions.
Figure 5A:
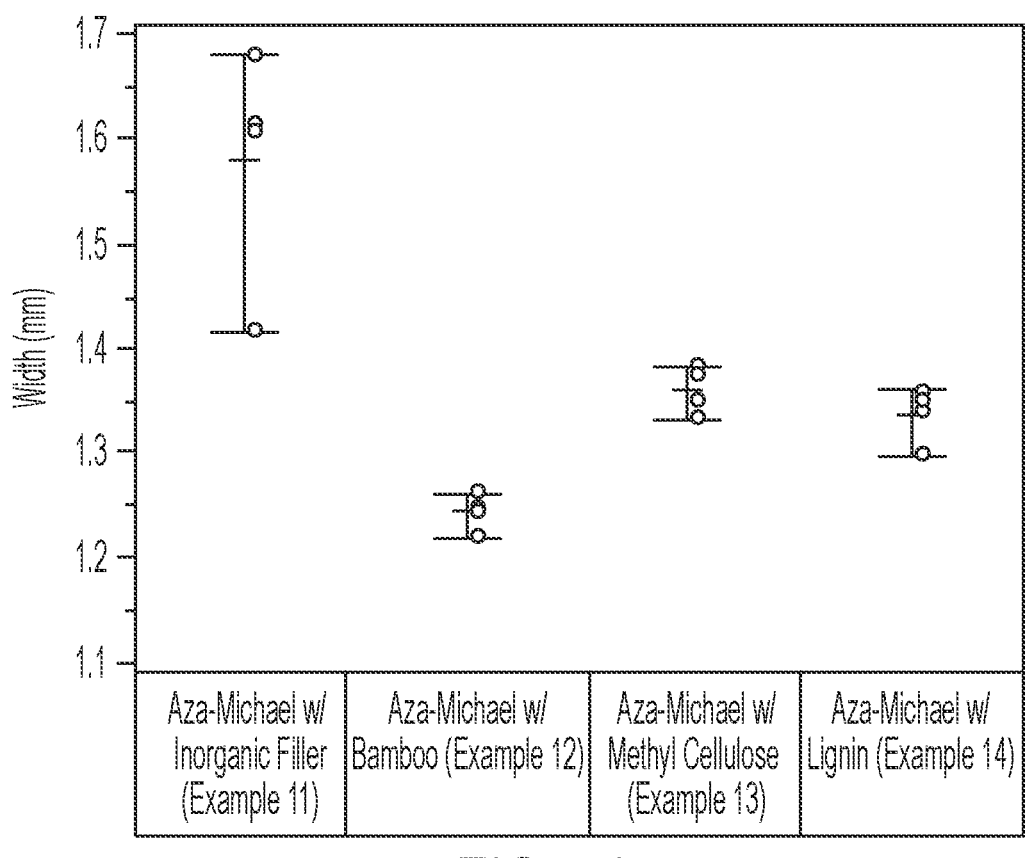
FIGS. 5A and 5B show horizontal buildability data, including stack width and standard deviation thereof, for various Aza-Michael compositions.
Figure 5B:
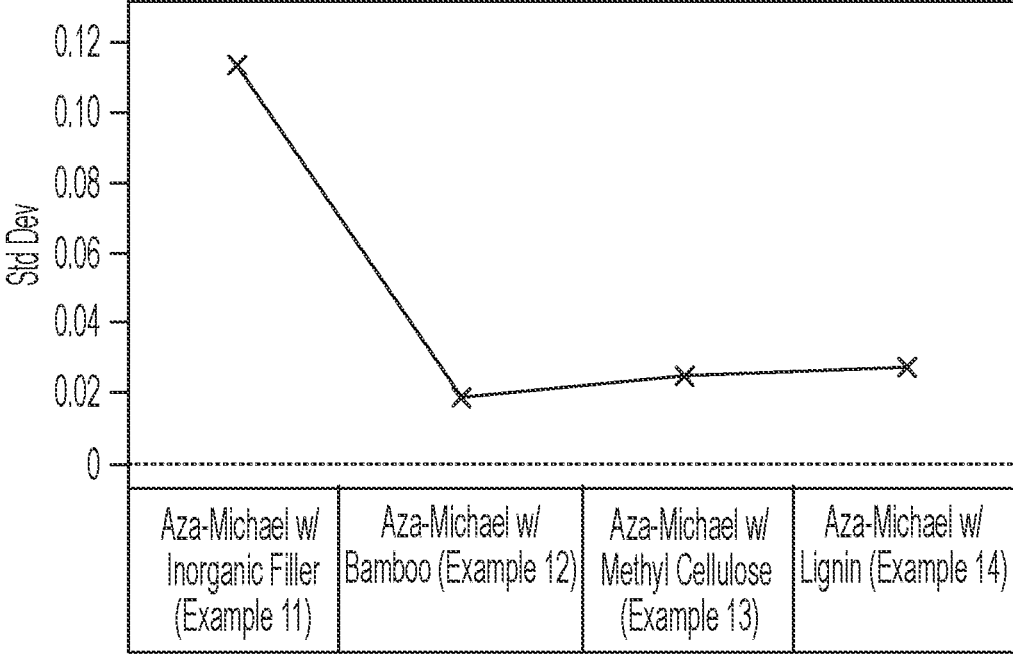

As supported by buildability data shown in Table 45, the Aza-Michael compositions with organic (i.e., low-ash) fillers measured improved vertical buildability (the closer to 1 mm/layer the better) and improved horizontal buildability (the smaller the standard deviation in stack width the better). FIG. 4 is a plot of the vertical buildability measurements in stack height as a function of stack layer. The Aza-Michael composition with inorganic filler (Example 11a, represented with square symbols) only measured a height (in mm) per layer ratio of 0.625, just crossing the good vertical buildability threshold of 0.6. In contrast, the Aza-Michael compositions with organic fillers measured height (in mm) per layer ratios of 0.9 (Example 11d, represented with diamond symbols), 0.936 (Example 11c, represented with circle symbols), and 0.945 (Example 11b, represented with triangle symbols), which are all in the excellent vertical buildability range. Furthermore, the goodness-of-fit (i.e., R-squared) for all Aza-Michael compositions was excellent, at 0.9986 (Example 11d), 0.9989 (Example 11a), 0.9995 (Example 11b), and 0.9999 (Example 11c). In alignment with the improved vertical buildability, the horizontal buildability of the Aza-Michael compositions with non-organic fillers is improved when compared to the Aza-Michael composition with inorganic filler. (see FIGS. 5A and 5B). Specifically, the "low-ash" compositions (Examples 11b, 11c, 11d) showed notably smaller standard deviations in stack widths and widths closer to 1 mm (i.e., the intended width) than that of the "standard" composition (Example 11a).

Figure 6:
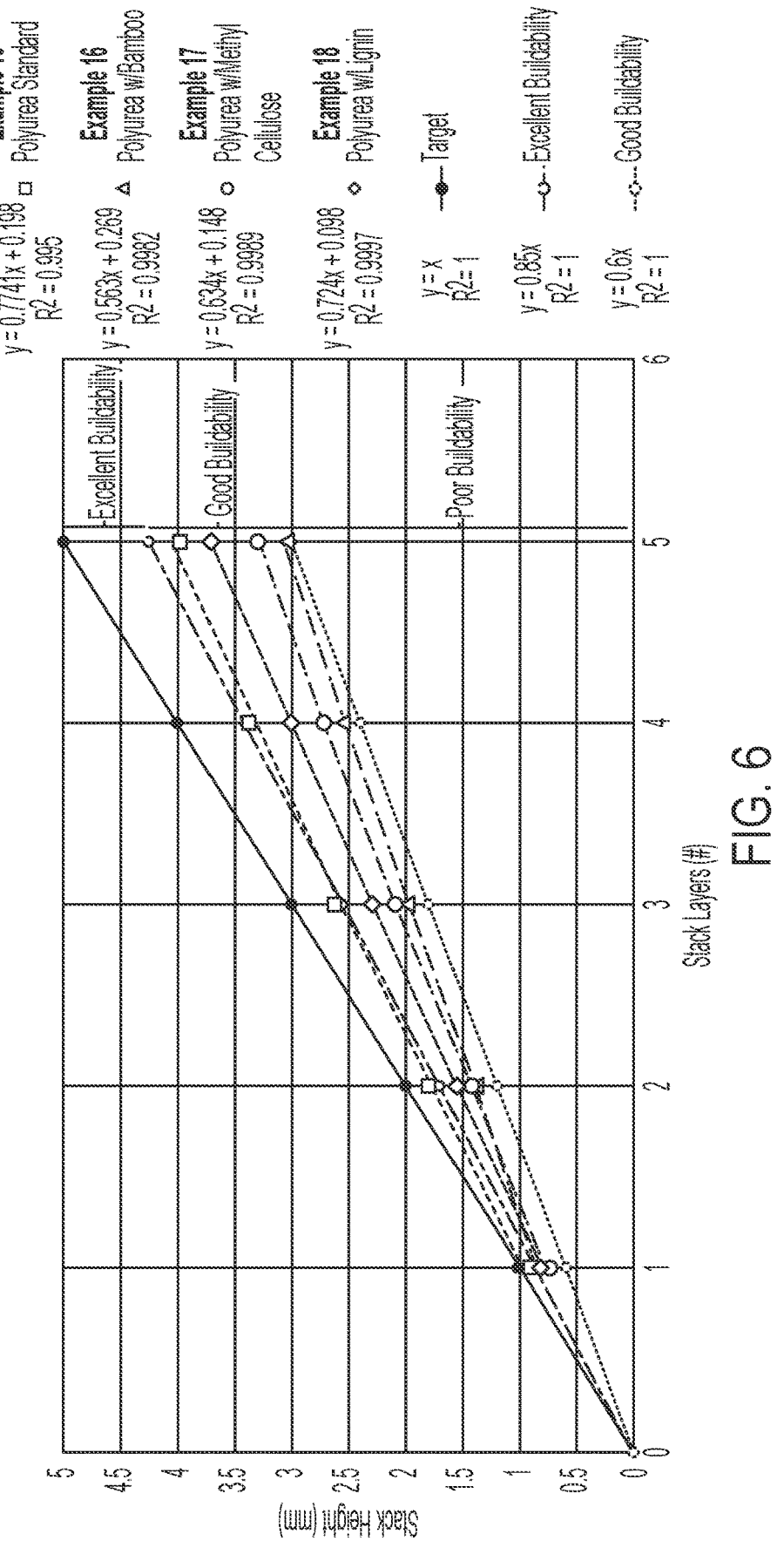
FIG. 6 shows a vertical buildability plot for various polyurea compositions.
Figure 7A:
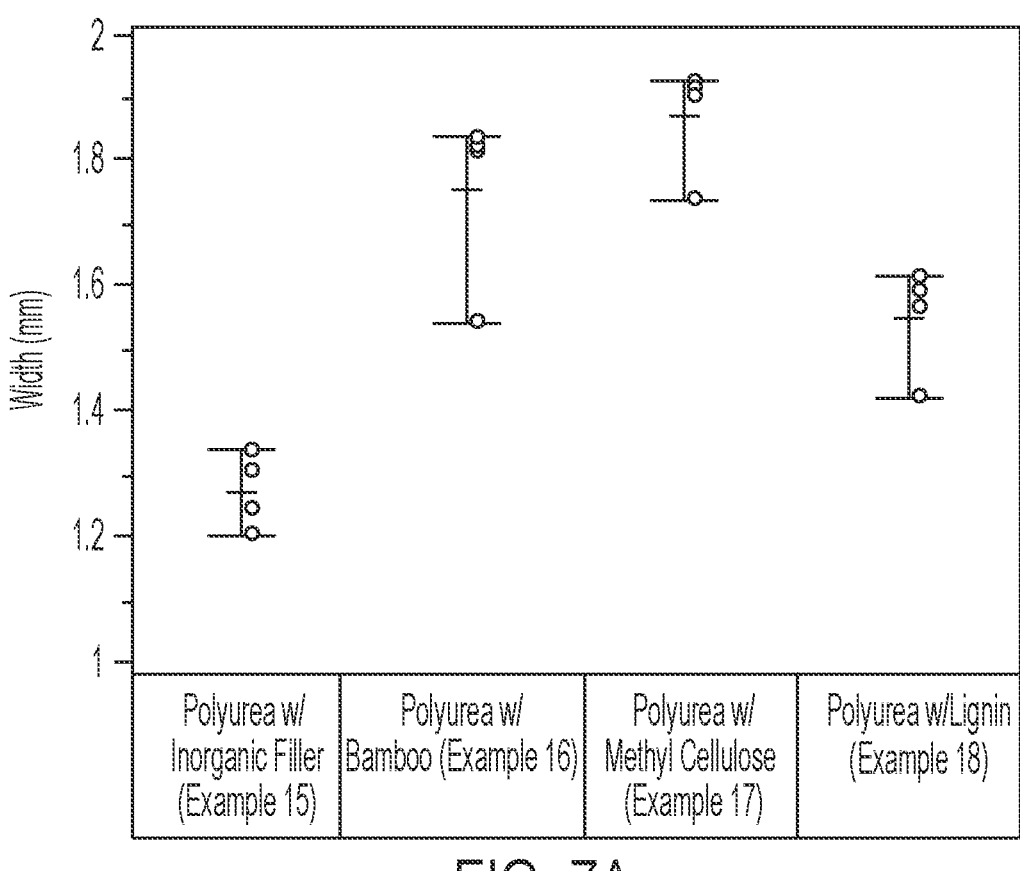
FIGS. 7A and 7B show horizontal buildability data, including stack width and standard deviation thereof, for various polyurea compositions.
Figure 7B:
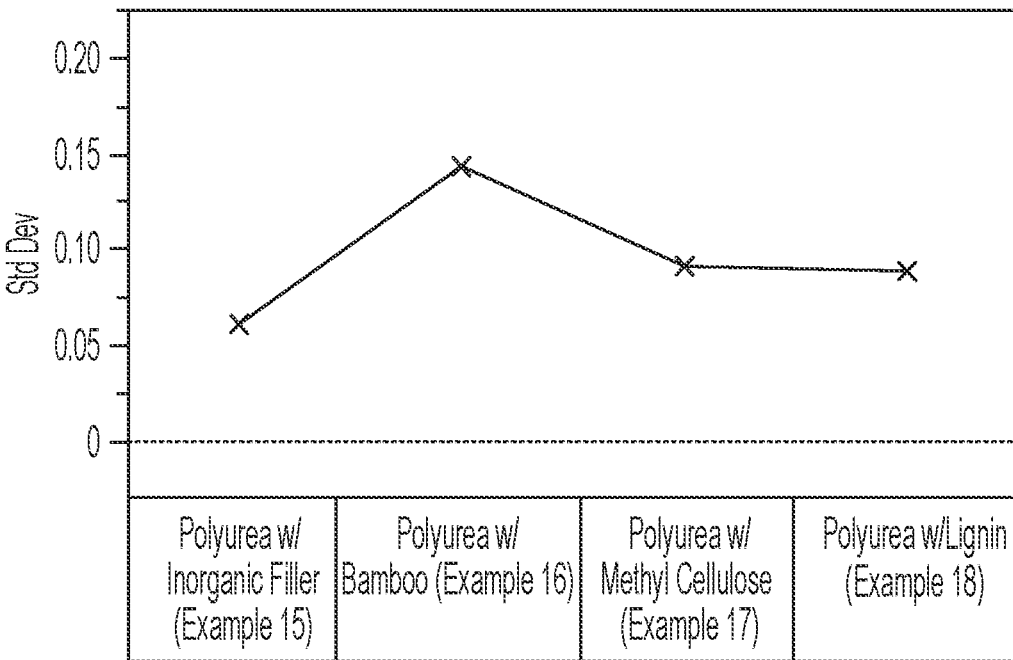

Turning to the polyurea compositions, the vertical buildability of the "low-ash" polyurea compositions (Examples 11f, 11g, 11h) lowered slightly when compared to the "standard" polyurea composition (Example 11e). Specifically, the height (in mm) per layer ratio decreased from 0.774 (Example 11e, represented with square symbols) to 0.724 (Example 11h, represented with diamond symbols), to 0.634 (Example 11g, represented with circle symbols), and to 0.563 (Example 11f, represented with triangle symbols), according to the measurements shown in FIG. 6. Aside from the polyurea composition with bamboo filler (Example 11f), which falls just below the good buildability ratio threshold, all other polyurea compositions fall within the good vertical buildability range. This indicates that the polyurea compositions generally maintained good buildability after obtaining their low-ash characteristics. The excellent goodness-of-fit (i.e., R-squared) for the polyurea compositions further support the maintained good buildability in terms of consistency, measured at 0.995 (Example 11e), 0.9982 (Example 11f), 0.9989 (Example 11g), and 0.9997 (Example 11h). FIGS. 7A and 7B show horizontal buildability measurements for the polyurea compositions. Despite a slight increase when compared to the standard polyurea composition, the standard of deviation in stack width remained relatively low for the low-ash polyurea compositions.

As supported by the data, rheology and buildability measurements of the Aza-Michael compositions and polyurea compositions indicate that, switching from the use of inorganic fillers to organic fillers to gain the low-ash characteristics may in additionally improve or at least relatively maintain a material's mechanical integrity (e.g., as indicated by yield stress and/or storage modulus) and buildability (e.g., consistency and/or accuracy both vertically and horizontally). It is to be appreciated that the formulations of the low-ash compositions may be further tailored to achieve better values, such as by increasing filler loading or switching to other fillers (e.g., of different size and/or shape).

Example 13—Low-Ash Coreactive Compositions

In this example, multiple different combinations of co-reactive components are mixed to create multiple co-reactive compositions suitable for 3D printing low-ash objects in accordance with the present disclosure. The compositions are prepared, printed, and tested in the same fashion as examples 1-10 and each include at least one filler present in a total amount from 1 wt. % to 20 wt. % based on a total weight of the composition. Each composition includes, based on a total weight of the composition, a total amount of less than 2.5 wt. % of components that are noncombustible when subjected to a temperature of at least 450° C. for at least 12 hours. Table 46 shows the possible combinations of components.

TABLE 46

| Component A | Component B |
| --- | --- |
| Carboxylic Acid | Epoxide |
| Activated unsaturated groups such as acrylate, maleic, or fumaric | Primary or Secondary Amine |
| Isocyanate | Primary or Secondary Amine |
| Isocyanate | Hydroxyl |
| Cyclic Carbonate | Primary or Secondary Amine |
| Acetoacetate | Primary or Secondary Amine |
| Epoxide | Primary or Secondary Amine |
| Thiol | Alkenyl |
| Thiol | Vinyl Ether |
| Thiol | Methacrylate |
| Activated unsaturated groups such as acrylate or maleic | Malonate |

Example 14—Investment Casting

In this example, an investment casting method begins by 3D printing an object using a low-ash co-reactive composition in accordance with the present disclosure. The method continues to coat the printed object in a refractory mold material to form a mold around the object. Further, the printed object is next removed from the mold by combusting the printed object. The method next proceeds to casting a final casting a final molded object within the mold. Lastly, the method proceeds to divesting the mold from the final molded object.

ASPECTS OF THE INVENTION

The invention can be further defined by one or more of the following aspects.

Aspect 1. A reactive additive manufacturing composition, comprising: a first reactive component; a second reactive component; and at least one filler that is nonreactive with at least one of the first reactive component and the second reactive component, the at least one filler present in a total amount from 1 wt. % to 20 wt. % based on a total weight of the composition; wherein the composition comprises, based on a total weight of the composition, a total amount of less than 2.5 wt. % of components that are noncombustible when subjected to a temperature of at least 450° C. for at least 12 hours.

Aspect 2. The composition of aspect 1, wherein the first reactive component comprises a compound selected from the group of an isocyanate, an acrylate, and an epoxy, and the second reactive component comprises a compound selected from the group of an amine and a polyol.

Aspect 3. The composition of aspect 1 or aspect 2, wherein the at least one filler comprises at least one of a cellulosic polymer, an organic extract, a polysaccharide, a nonionic synthetic associative thickener, a urethan resin, a ground thermoplastic, a ground thermoset, a polyamide wax, and a polymeric expandable microsphere.

Aspect 4. The composition of aspect 3, wherein the polysaccharide has the following formula:

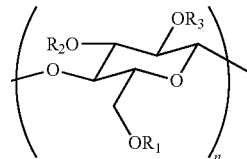

wherein $R_1$, $R_2$, and $R_3$ are independently hydrogen or alkyl groups and n is greater than 10.

Aspect 5. The composition of aspect 3, wherein the cellulosic polymer is selected from the group of methylcellulose, carboxymethylcellulose, cellulose acetate butyrate, and combinations thereof.

Aspect 6. The composition of any of aspects 1-5, wherein the filler is present in an amount from 5 wt. % to 20 wt. % based on a total weight of the composition.

Aspect 7. The composition of any of aspects 1-6, wherein the filler comprises an organic filler and an inorganic filler, the inorganic filler being present in an amount less than the amount of the organic filler.

Aspect 8. The composition of aspect 7 wherein the inorganic filler comprises fumed silica.

Aspect 9. The composition of any of aspects 1-8, when deposited to form a stack of beads having a single-bead-width using a 1 mm nozzle size and a 1 mm fly height, has a height per stack layer ratio between 0.5 to 0.99 mm/layer.

Aspect 10. The composition of any of aspects 1-9, when deposited to form a stack of beads having a single-bead-width using a 1 mm nozzle size and a 1 mm fly height, has a standard deviation in stack width below 0.25 mm.

Aspect 11. A method of forming an object with a reactive additive manufacturing composition comprising: combining a first reactive component, a second reactive component, and at least one filler that is nonreactive with at least one of the first reactive component and the second reactive component; mixing the first component, the second component, and the filler to form a reactive additive manufacturing composition; and depositing the reactive additive manufacturing composition through a nozzle fluidly coupled to the mixer to form a three-dimensional object, wherein the three-dimensional object comprises, based on a total weight of the three-dimensional object, a total amount of less than 2.5 wt. % of components that are noncombustible when subjected to a temperature of at least 450° C. for at least 12 hours.

Aspect 12. The method of aspect 11, wherein the reactive additive manufacturing composition, when deposited to form a stack of beads having a single-bead-width using a 1 mm nozzle size and a 1 mm fly height, has a height per stack layer ratio between 0.5 to 0.99 mm/layer.

Aspect 13. The method of any of aspects 11-12 wherein the reactive additive manufacturing composition, when deposited to form a stack of beads having a single-bead-width using a 1 mm nozzle size and a 1 mm fly height, has a standard deviation in stack width below 0.25 mm.

Aspect 14. The method of any of aspects 11-13 wherein the first reactive component comprises a compound selected from the group of an isocyanate, an acrylate, and an epoxy, and the second reactive component comprises a compound selected from the group of an amine and a polyol.

Aspect 15. The method of aspect 14, wherein the first reactive component comprises a polyisocyanate monomer, a polyisocyanate prepolymer, or a combination thereof, and the second reactive component comprises a polyamine monomer, a polyamine prepolymer, or a combination thereof.

Aspect 16. The method of any of aspects 11-15, further comprising, after the depositing step: coating the three-dimensional object with a refractory mold material to form a mold around the three-dimensional object; removing the three-dimensional object from the mold by combusting the three-dimensional object; casting a final molded object within the mold; and divesting the mold from the final molded object.

Aspect 17. A three-dimensional object formed by reactive additive manufacturing, comprising: the reaction product of a first component and a second component; and at least one filler present in an amount from 1 wt. % to 20 wt. % based on a total weight of the composition and the object, wherein the filler is nonreactive with at least one of the first and second components; wherein the object comprises, based on a total weight of the object, a total amount of less than 2.5 wt. % of components that are noncombustible when subjected to a temperature of at least 450° C. for at least 12 hours.

Aspect 18. The object of aspect 17, wherein the filler is present in an amount from 5 wt. % to 20 wt. % based on a total weight of the composition.

Aspect 19. The object of aspect 17 or aspect 18, wherein the first reactive component comprises a polyisocyanate monomer, a polyisocyanate prepolymer, or a combination thereof, and the second reactive component comprises a polyamine monomer, a polyamine prepolymer, or a combination thereof.

Aspect 20. The object of any of aspects 17-19 wherein the reaction product comprises at least one of a polyurea, a polyurethane, an epoxy-amine, and an Aza-Michael addition product.

Aspect 21. The method of any of aspects 11-16, further comprising, prior to the depositing step, the steps of: conveying the first component from a first reservoir to the mixer; and conveying the second component and the filler from a second reservoir to the mixer.

Aspect 22. The method of any of aspects 11-16 and 22, wherein the at least one filler comprises a polysaccharide of the following formula:

wherein R1, R2, and R3 are independently hydrogen or alkyl groups and n is greater than 10.

Aspect 23. The method of any of aspects 11-16 and 22-23, wherein the mixing step is carried out in a static mixer.

Aspect 24. The object of any of aspects 17-20, wherein the at least one filler comprises a polysaccharide of the following formula:

wherein $R_1$, $R_2$, and $R_3$ are independently hydrogen or alkyl groups and n is greater than 10.

Aspect 25. The object of any of aspects 17-20 and 24, wherein the at least one filler comprises at least one cellulosic polymer selected from methylcellulose, carboxymethylcellulose, cellulose acetate butyrate, and combinations of the foregoing.

Aspect 26. A method of investment casting to form a final molded object, comprising: combining a first reactive component, a second reactive component, and at least one filler that is nonreactive with at least one of the first reactive component and the second reactive component; mixing the first component, the second component, and the filler to form a reactive additive manufacturing composition; depositing the reactive additive manufacturing composition through a nozzle fluidly coupled to the mixer to form a three-dimensional object; coating the three dimensional object with a refractory mold material to form a mold around the three dimensional object; removing the three-dimensional object from the mold by combusting the three dimensional object, wherein combusting the three dimensional object produces a total ash residue of less than 2.5 wt. % based on a total weight of the three dimensional object; casting a final molded object within the mold; and divesting the mold from the final molded object.

Aspect 27. The method of aspect 26, wherein the first reactive component comprises a compound selected from the group of an isocyanate, an acrylate, and an epoxy, and the second reactive component comprises a compound selected from the group of an amine and a polyol.

Aspect 28. The method of aspect 26 or aspect 27, wherein the filler comprises at least one of a lignocellulose, a wax thixotrope, a thermoplastic expandable microsphere, a nonionic synthetic associative thickener, a urethane resin, a ground thermoplastic, a ground thermoset, and an organic extract.

Aspect 29. The method of any one of aspects 26-28, wherein the reactive additive manufacturing composition comprises at least one of a polyurea, a polyurethane, an epoxy-amine, and an Aza-Michael addition product.

Whereas particular examples of this invention have been described above for purposes of illustration, it will be evident to those skilled in the art that numerous variations of the details of the present invention may be made without departing from the invention as defined in the appended claims.

What is claimed is:

1. A reactive additive manufacturing composition, comprising: a first reactive component;
a second reactive component; and
at least one filler that is nonreactive with at least one of the first reactive component and the second reactive component, the at least one filler present in a total amount from 1 wt. % to 20 wt. % based on a total weight of the composition;
wherein the composition comprises, based on a total weight of the composition, a total amount of less than 2.5 wt. % of components that are noncombustible when subjected to a temperature of at least 450° C. for at least 12 hours; and
wherein the first reactive component and the second reactive component react and cure at ambient conditions to form the reactive additive manufacturing composition.

2. The composition of claim 1, wherein the first reactive component comprises a compound selected from the group of an isocyanate, an acrylate, and an epoxy, and the second reactive component comprises a compound selected from the group of an amine and a polyol.

3. The composition of claim 1, wherein the at least one filler comprises at least one of a cellulosic polymer, an organic extract, a polysaccharide, a nonionic synthetic associative thickener, a urethan resin, a ground thermoplastic, a ground thermoset, a polyamide wax, and a polymeric expandable microsphere.

4. The composition of claim 3, wherein the polysaccharide has the following formula:

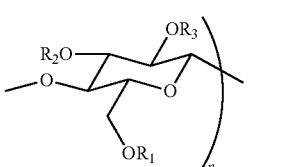

wherein R1, R2, and R3 are independently hydrogen or alkyl groups and n is greater than 10.

5. The composition of claim 3, wherein the cellulosic polymer is selected from the group of methylcellulose, carboxymethylcellulose, cellulose acetate butyrate, and combinations thereof.

6. The composition of claim 1, wherein the filler is present in an amount from 5 wt. % to 20 wt. % based on a total weight of the composition.

7. The composition of claim 1, wherein the filler comprises an organic filler and an inorganic filler, the inorganic filler being present in an amount less than the amount of the organic filler.

8. The composition of claim 7 wherein the inorganic filler comprises fumed silica.

9. A method of forming an object with a reactive additive manufacturing composition comprising:
combining a first reactive component, a second reactive component, and at least one filler that is nonreactive with at least one of the first reactive component and the second reactive component;
mixing the first component, the second component, and the filler to form a reactive additive manufacturing composition;
wherein the first reactive component and the second reactive component react and cure at ambient conditions to form the reactive additive manufacturing composition; and
depositing the reactive additive manufacturing composition through a nozzle fluidly coupled to the mixer to form a three-dimensional object, wherein the three-dimensional object comprises, based on a total weight of the three-dimensional object, a total amount of less than 2.5 wt. % of components that are noncombustible when subjected to a temperature of at least 450° C. for at least 12 hours.

10. The method of claim 9, wherein the reactive additive manufacturing composition, when deposited to form a stack of beads having a single-bead-width using a 1 mm nozzle size and a 1 mm fly height, has a height per stack layer ratio between 0.5 to 0.99 mm/layer.

11. The composition of claim 9, wherein the reactive additive manufacturing composition, when deposited to form a stack of beads having a single-bead-width using a 1 mm nozzle size and a 1 mm fly height, has a standard deviation in stack width below 0.25 mm.

12. The composition of claim 9, wherein the first reactive component comprises a compound selected from the group of an isocyanate, an acrylate, and an epoxy, and the second reactive component comprises a compound selected from the group of an amine and a polyol.

13. The method of claim 12, wherein the first reactive component comprises a polyisocyanate monomer, a polyisocyanate prepolymer, or a combination thereof, and the second reactive component comprises a polyamine monomer, a polyamine prepolymer, or a combination thereof.

14. The composition of claim 9, further comprising, after the depositing step:
coating the three-dimensional object with a refractory mold material to form a mold around the three-dimensional object;
removing the three-dimensional object from the mold by combusting the three-dimensional object;
casting a final molded object within the mold; and
divesting the mold from the final molded object.

* * * * *